United States Patent

Abe et al.

[11] Patent Number: 6,075,438
[45] Date of Patent: Jun. 13, 2000

[54] COMMUNICATION NETWORK FOR VEHICLE CONTROL AND DIAGNOSIS METHOD THEREOF

[75] Inventors: Tomofumi Abe; Hirofumi Ohtsuka; Hirohide Suda; Kouji Yamaoka; Seiju Kawamata, all of Saitama-ken, Japan

[73] Assignee: Honda Giken Kogyo Kabushiki Kaisha, Tokyo, Japan

[21] Appl. No.: 08/798,019

[22] Filed: Feb. 6, 1997

[30] Foreign Application Priority Data

Feb. 9, 1996 [JP] Japan .................................. 8-046855

[51] Int. Cl.$^7$ .................................................. G08B 23/00
[52] U.S. Cl. .................... 340/286.01; 340/506; 340/438; 307/9.1
[58] Field of Search ...................... 340/438, 506, 340/825.06, 825.07, 825.16, 825.17, 825.34, 286.02, 309.3, 309.4, 314; 307/9.1; 364/701

[56] References Cited

U.S. PATENT DOCUMENTS

| 5,525,959 | 6/1996 | Przybyla et al. .......................... 340/438 |
| 5,670,939 | 9/1997 | Rodewald et al. ....................... 340/514 |

FOREIGN PATENT DOCUMENTS

| 57-86544 | 5/1982 | Japan . |
| 58-149834 | 6/1983 | Japan . |
| 6-30477 | 2/1994 | Japan . |
| 6-67709 | 8/1994 | Japan . |

*Primary Examiner*—Jeffery A. Hofsass
*Assistant Examiner*—Daryl C. Pope
*Attorney, Agent, or Firm*—Armstrong, Westerman, Hattori, McLeland & Naughton

[57] ABSTRACT

A communication network for vehicle control and a method of diagnosing the same in which the self-diagnosis functions attributed to some of control units in the communication network are combined with a manual diagnosis operation, whereby the diagnosis can be carried out by a relatively simple arrangement without sacrificing readiness and correctness, thus ensuring higher cost performance and reliability. The communication network includes control units, each coupled to at least one of auxiliary input and output devices, connected with communication lines to one another for transmitting and receiving unique signals. Each of at least two of the control units includes a transmitter, a receiver, a controller, and an indicating means, and has a diagnosis function. In a diagnosis mode, a receiver of the control unit with the diagnosis function upon receiving the unique signal from another control unit examines whether the unique signal is normal or not, and whether an input signal received from the auxiliary input device connected thereto is authentic or not. On the basis of the results of examination, the control unit determines the presence of fault in the communication network and energizes the indicating means in a corresponding manner.

21 Claims, 17 Drawing Sheets

FIG. 13
| ERROR CODE | | PRIORITY ORDER IN CHECKING FAULT | | |
|---|---|---|---|---|
| BUZZER 15 | IG KEY LIGHT 25 | 1 | 2 | 3 |
| 1 | 1 | #1 COMMUNICATION LINE 2 | DOOR ECU 30 | |
| 2 | 2 | #2 COMMUNICATION LINE 4 | Dr ECU 20 | As ECU 10 |
| 3 | 3 | #3 COMMUNICATION LINE 6 | As ECU 10 | Dr ECU 20 |
| — | 3 | As ECU 10 | | |
| 2 | — | Dr ECU 20 | | |
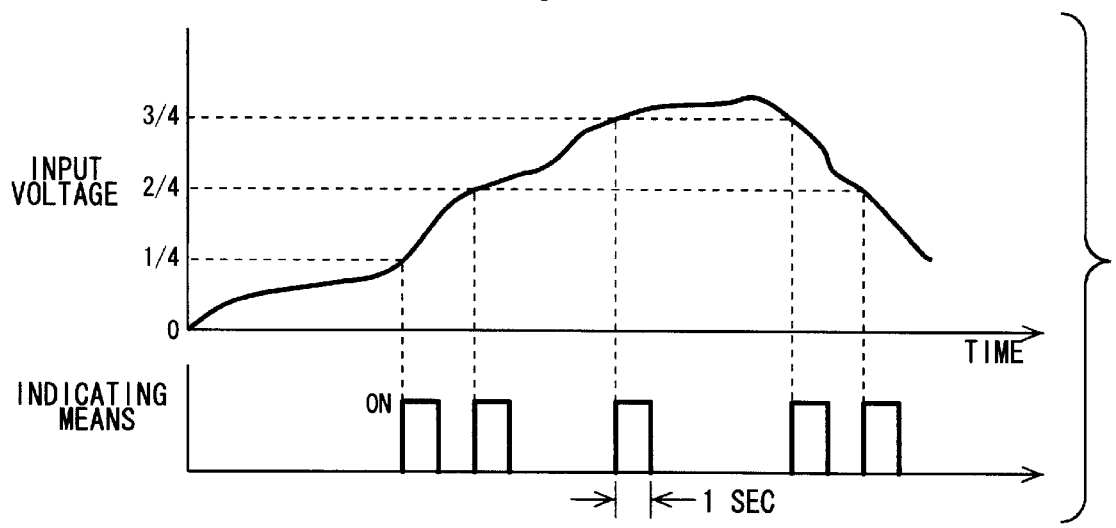
FIG. 15
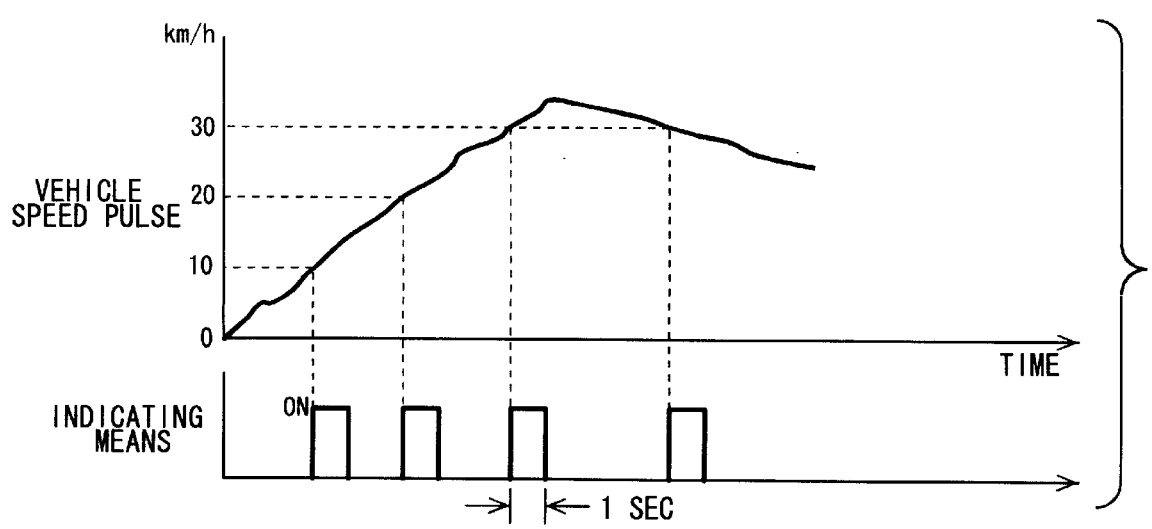
FIG. 16

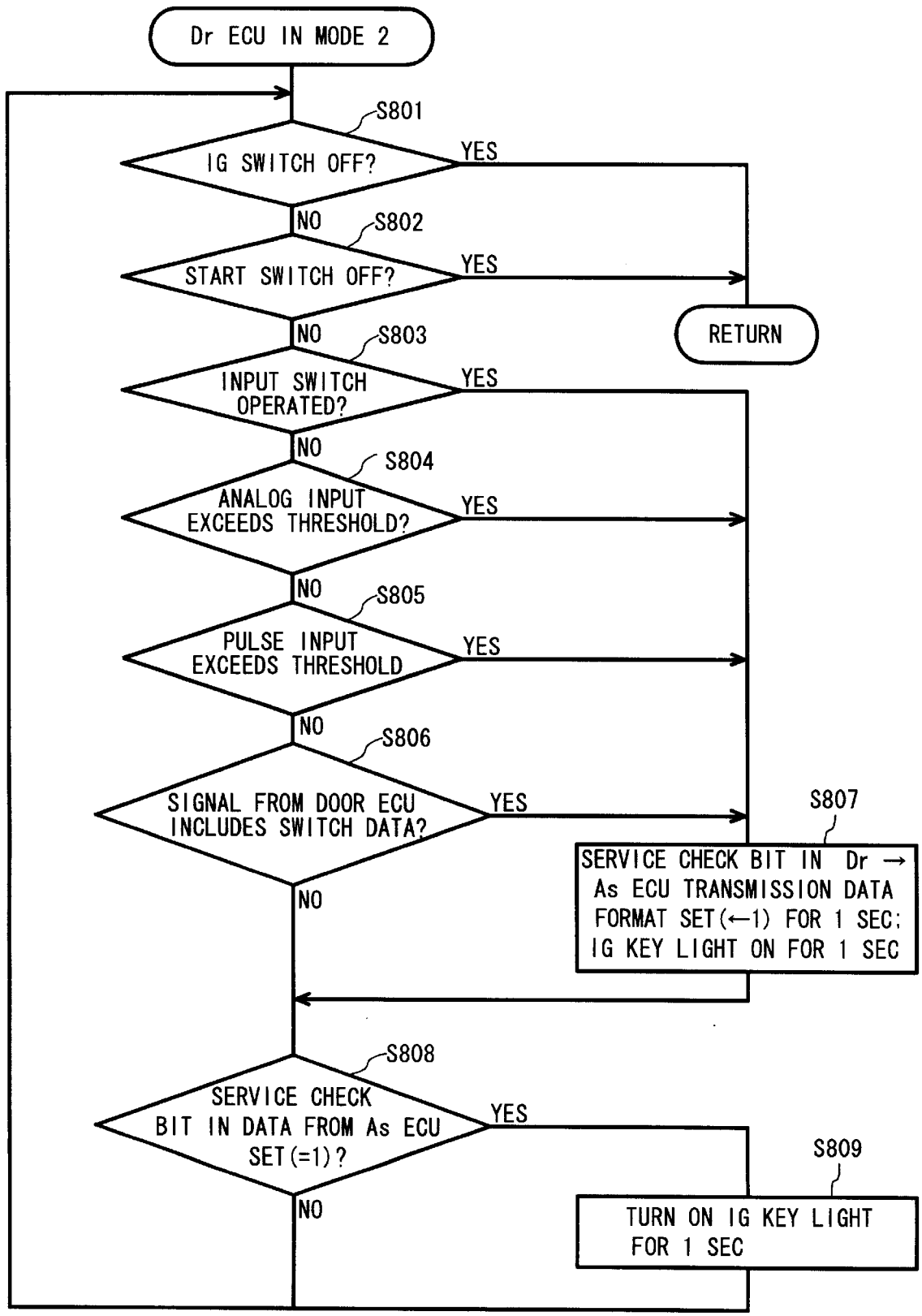

○ : CONNECTED
× : NON-CONNECTED

FIG. 20
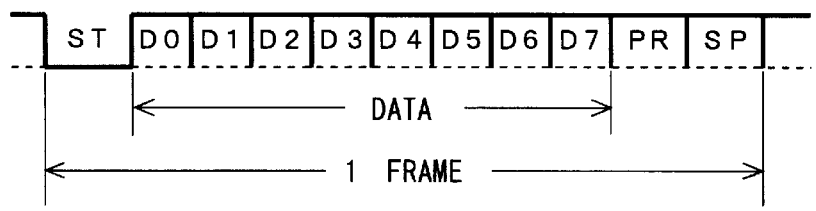
FIG. 21
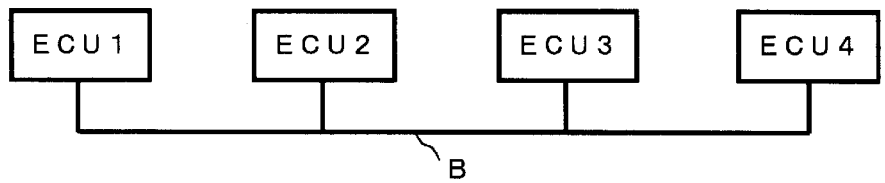
FIG. 22
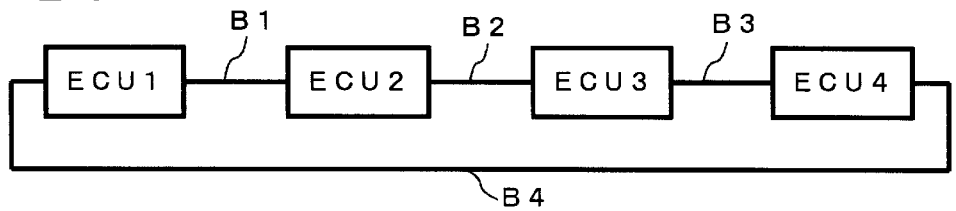
FIG. 23
FIG. 24
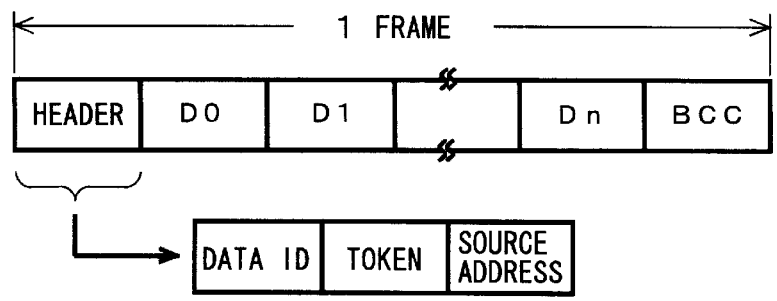

COMMUNICATION NETWORK FOR VEHICLE CONTROL AND DIAGNOSIS METHOD THEREOF

BACKGROUND OF THE INVENTION

1. Field of the Invention

The present invention relates to a communication network for vehicle control and a method of diagnosing the same, and more particularly, to a communication network for vehicle control which comprises a plurality of control units connected to one another via communication lines for transmitting and receiving their respective unique signals, each control unit accompanied with at least one of auxiliary input and output devices, each of at least two of the control units comprising a transmitter, a receiver, a controller, and an indicating or displaying means and provided with a diagnosis function, and a method of diagnosing the same.

2. Description of the Related Art

A communication network for vehicle control is known comprising a plurality of control units (such as ECUs) connected to one another via communication lines for mutual communications, each control unit including a transmitter, a receiver, and a controller and accompanied with auxiliary input and output devices. If any internal fault or error occurs in such a vehicle control communications network, it is identified and located by the operator performing manual checking and examining voltages and conductions in the input, output, and transmission circuits of each of the control units. This action of identifying and locating a fault or error in the relevant circuits of the control unit or its component will require the operator to have a particular skill and take a considerable length of working time, hence degrading the quality of service.

For eliminating the above problems and speeding up the detection of a fault and its location in the control unit and its relevant circuits, various improvements have been introduced in which the control unit itself is provided with a self-diagnosis function for recording and indicating the fault and its location, or a separate error diagnosis system for subsequent check up, diagnosis and/or repair is prepared and connected to the self-diagnosis function of a vehicle to be examined for reading and indicating the fault data or locations. The self-diagnosis function is commonly started by the action of timer interruption, manual interruption, or specific switching. Such conventional improvements of the self-diagnosis function for use in a vehicle mounted electronic control apparatus are disclosed in Japanese Patent Laid-open Publications SHO57-86544, SHO58-149834, SHO62-279151, and HEI6-30477.

When the control units of a vehicle control communications network are provided with such a self-diagnosis function, they may perform the diagnosing action readily and accurately but cause the overall system arrangement of the vehicle control communication network to become bulky and complicated, thus increasing the cost of production. In addition, such a separate error diagnosis system capable of connection to the known self-diagnosis apparatus has to be prepared at every local service station whereby the overall cost will be much more increased.

For example, any fault in the conventional vehicle control communication network having the control units connected to one another via communication lines and being possible to be self-diagnosed, is examined whether it derives from the communicating functions between the control units (e.g. transmission function of signals and conformity of the specification and destination from one unit to another) or the input and output control functions. The faults in the communicating functions are further classified into those of the transmitter circuit, the receiver circuit, the communication lines, and the ECU in the control unit. The faults in the input and output control functions are classified into those of the auxiliary input and output devices, the signal lines, and the control circuit in the ECU. For automatically identifying and locating the fault in a conventional self-diagnosis method, a software of greater size is hence required. Also, its relating display and indicating means are needed of elaborate and bulky types, thus increasing further the overall cost.

SUMMARY OF THE INVENTION

It is an object of the present invention to provide a communication network for vehicle control and a method of diagnosing the same in which a fault examining operation is conducted with improved cost performance and reliability without reducing the readiness and accuracy by selectively utilizing an ingenious a combination of the self-diagnosis function of plurality of control units included in the communication network and the manual diagnosis function.

A vehicle control communications network according to the present invention includes a plurality of control units (ECUs) connected to one another via communication line for transmitting and receiving their respective unique signals, each of the control units accompanied with at least one of auxiliary input and output devices. At least two of the control units include a transmitter, a receiver, and a controller, and perform a diagnosis function, where each is provided with an indicating means.

In a diagnosis mode determined by a diagnosis mode signal generating means, the unique signal of another control unit is received by the receiver in a control unit with the diagnosis function and examined by the controller whether or not it is the unique signal of said another control unit. Also, the input signal from a desired one of the auxiliary input devices connected to the control unit with the diagnosis function is determined by the controller. Any fault or error in the communication network is hence detected on the basis of the received unique signal and the input signal, and the result of diagnosis is indicated by the indicating means. The unique signal includes the normal reception of the correct unique signal from another control unit, the condition of the communication lines, the conformity of the specification (and destination) between the control units, and the receipt of the input signal in the intra-control unit and said another control unit.

According to the present invention, a method of diagnosing a communication network for vehicle control which has a plurality of control units connected to one another via communication lines, each of the control units accompanied with an auxiliary input and/or output device(s), and a diagnosis mode signal generating means for placing the control units in a diagnosis mode, each of at least part of the control units including a transmitter, a receiver, a controller, and an indicating or displaying means, and performing a diagnosis function, is provided. The method comprises the steps of assigning one of a first diagnosis mode and a second diagnosis mode to the control units with the diagnosis function by operating the diagnosis mode signal generating means in a first given manner, and switching the diagnosis mode of the control unit to the other diagnosis mode by manipulating the diagnosis mode signal generating means with a second given manner when the control units are in said one diagnosis mode. In the first diagnosis mode, a control unit with the diagnosis function transmits its unique signal indicative of its operational condition to another control unit and simultaneously receives another unique signal from said another control unit, determines the condition of said another control unit or communication lines on the basis of the received signal, drives the indicating means for indicating of the result of diagnosis, and transmits its own unique signal including the result of diagnosis.

In the second diagnosis mode, the control unit, when receiving a signal from one of its auxiliary input devices, drives the corresponding auxiliary output device connected thereto and assigned as an indicating means for indicating of the signal input and simultaneously, transmits its own unique signal including a signal indicative of the signal input. In addition, upon detecting that the unique signal received from said another control unit carries information of signal input to the other control unit, it drives the corresponding indicating means for indicating the signal input.

BRIEF DESCRIPTION OF THE DRAWINGS

FIG. 13 is a table showing the relation between error code and error locating sequence in the embodiment;

FIG. 14 is a flowchart showing steps of the diagnosis mode 2 (FIG. 3) in the Dr ECU, FIG. 15 is a diagram showing the relation between analog input, threshold therefor, and driving time for an indicating load;

FIG. 16 is a diagram showing the relation between pulse input, threshold therefor, and driving time for an indicating load;

FIG. 20 is a diagram showing an example of a frame of the unique signal use in the embodiment of the present invention;

FIG. 21 is a diagram showing an example of a packet of the unique signal used in the embodiment;

FIG. 22 is a schematic view of a modification of the vehicle control communication network in which the control units are connected to each other with a common bus line;

FIG. 23 is a schematic view of another modification of the vehicle control communication network in which the control units are connected in a loop; and FIG. 24 is a diagram of a packet of the unique signal adapted to another embodiment of the present invention.

DETAILED DESCRIPTION OF THE PREFERRED EXEMPLARY EMBODIMENT

A preferred exemplary embodiment of the present invention will be described referring to the accompanying drawings. The embodiment of the present invention is herein illustrated in the form of but not limited to a vehicle control communication network including a plurality of control units connected to each other with a point-to-point communication line, and is applicable to any connection type of vehicle control communication network.

Figure 1:
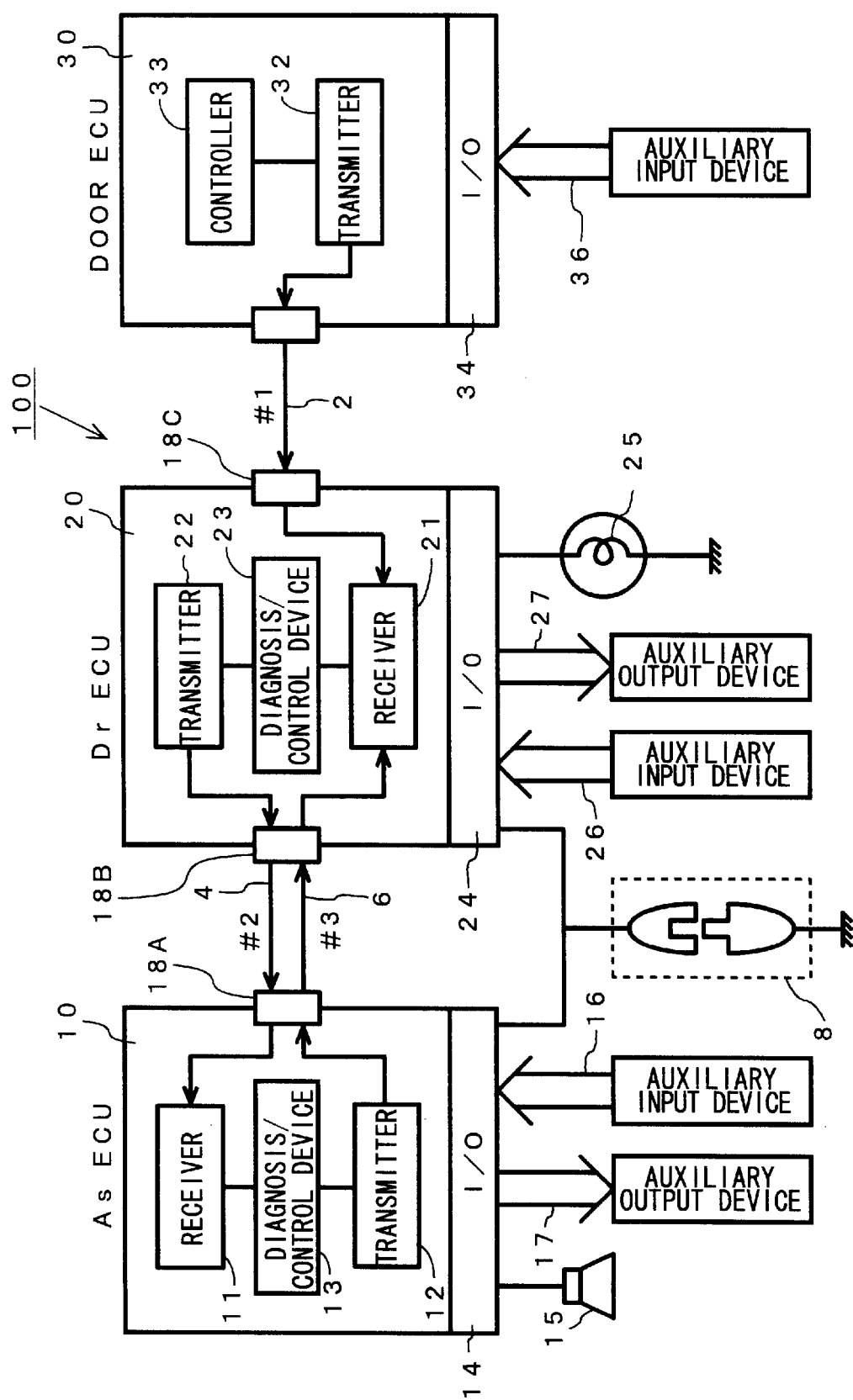
FIG. 1 is a block diagram of a preferred exemplary; and embodiment of the present invention.

FIG. 1 is a block diagram of a primary arrangement of the vehicle control communication network according to the preferred exemplary embodiment of the present invention. The vehicle control communication network 100 comprises three electronic control units of an assistant (As) ECU 10, a driver (Dr) ECU 20 and a Door ECU 30, communications lines 2, 4, and 6 connected between the control units, and a variety of auxiliary input and output devices connected to each control unit. The As ECU 10 includes a receiver 11, a transmitter 12 and a diagnosis/control device 13, and is connected through an I/O interface 14 to its auxiliary input devices 16 such as switches and/or sensors, and its auxiliary output devices 17 such as relays, indicator lamps, and a warning horn. A buzzer 15 is one of the auxiliary output devices but is also used as a means for indicating the result of diagnosis in a diagnosis mode of the preferred exemplary embodiment and hence.

The Dr ECU 20 includes a receiver 21, a transmitter 22 and a diagnosis/control device 23, and is connected through an I/O interface 24 to its auxiliary input devices 26 such as switches and/or sensors and its auxiliary output devices 27 such as relays. An ignition (IG) key light 25 is one of the auxiliary output devices but is also used as a means for indicating the result of diagnosis in the diagnosis mode.

Figure 2A:
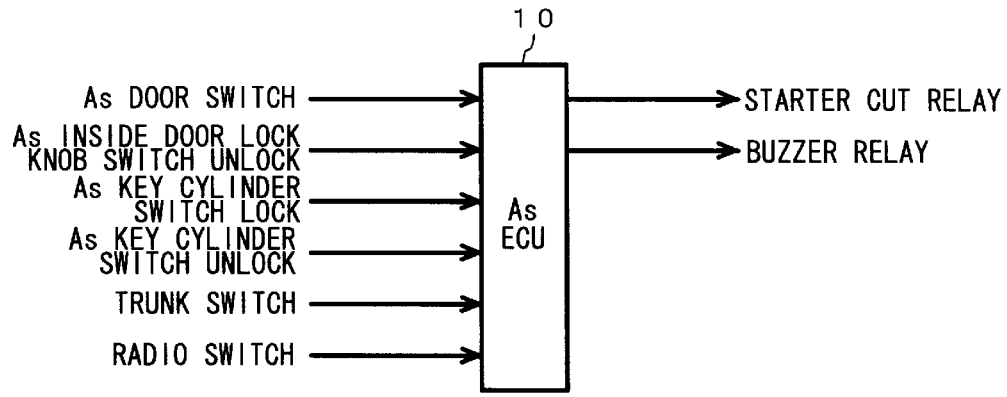
FIGS. 2A to 2C are views of ECUs connected with exemplary auxiliary input and output devices.
Figure 2B:
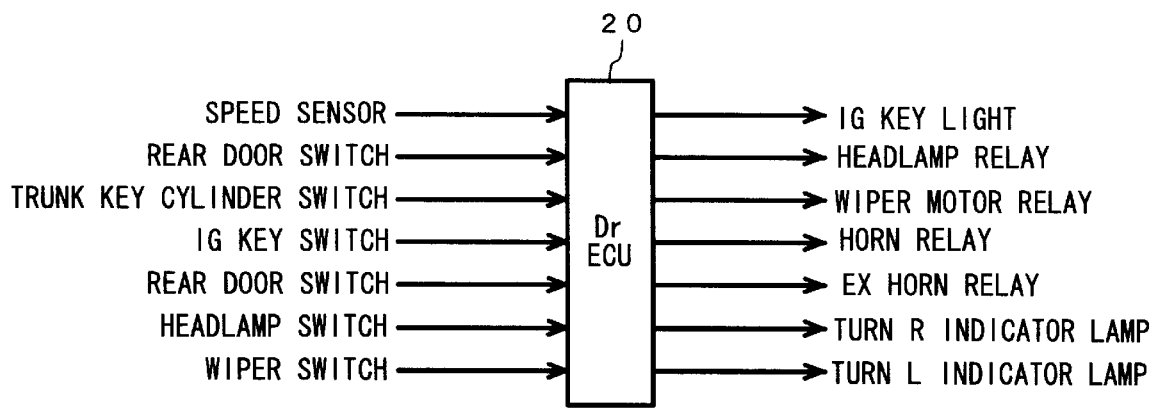
Figure 2C:
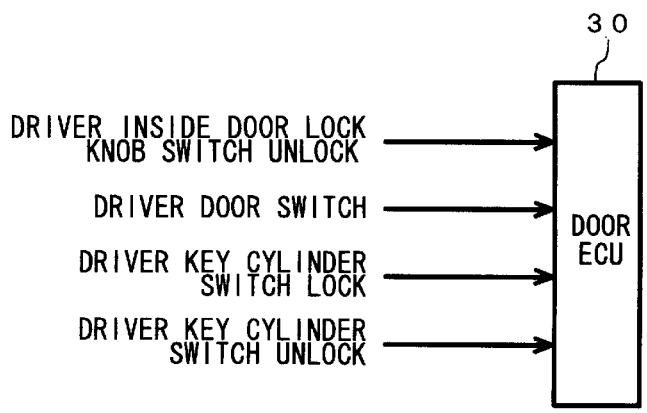

The Door ECU 30 includes a transmitter 32 and a controller 33 and is connected through an I/O interface 34 to its auxiliary input devices 36. The transmitter 32 of the Door ECU 30 is connected by the #1 communication line 2 to the receiver 21 of the Dr ECU 20. Similarly, the transmitter 22 of the Dr ECU 20 is connected by the #2 communication line 4 to the receiver 11 of the As ECU 10, and the transmitter 12 of the As ECU 10 is connected by the #3 communication line 6 to the receiver 21 of the Dr ECU 20. The I/O interfaces 14 and 24 are connected to a common diagnosis mode start switch 8 (a coupler in the preferred exemplary embodiment). FIGS. 2A to 2C illustrate typical examples of the auxiliary input and output devices connected to the ECUs 10, 20, and 30, respectively. The start switch 8 is preferably a coupler, not a common on/off switch, which prevents the driver from connecting by mistake to unexpectedly turn the network into the diagnosis mode.

Figure 3:
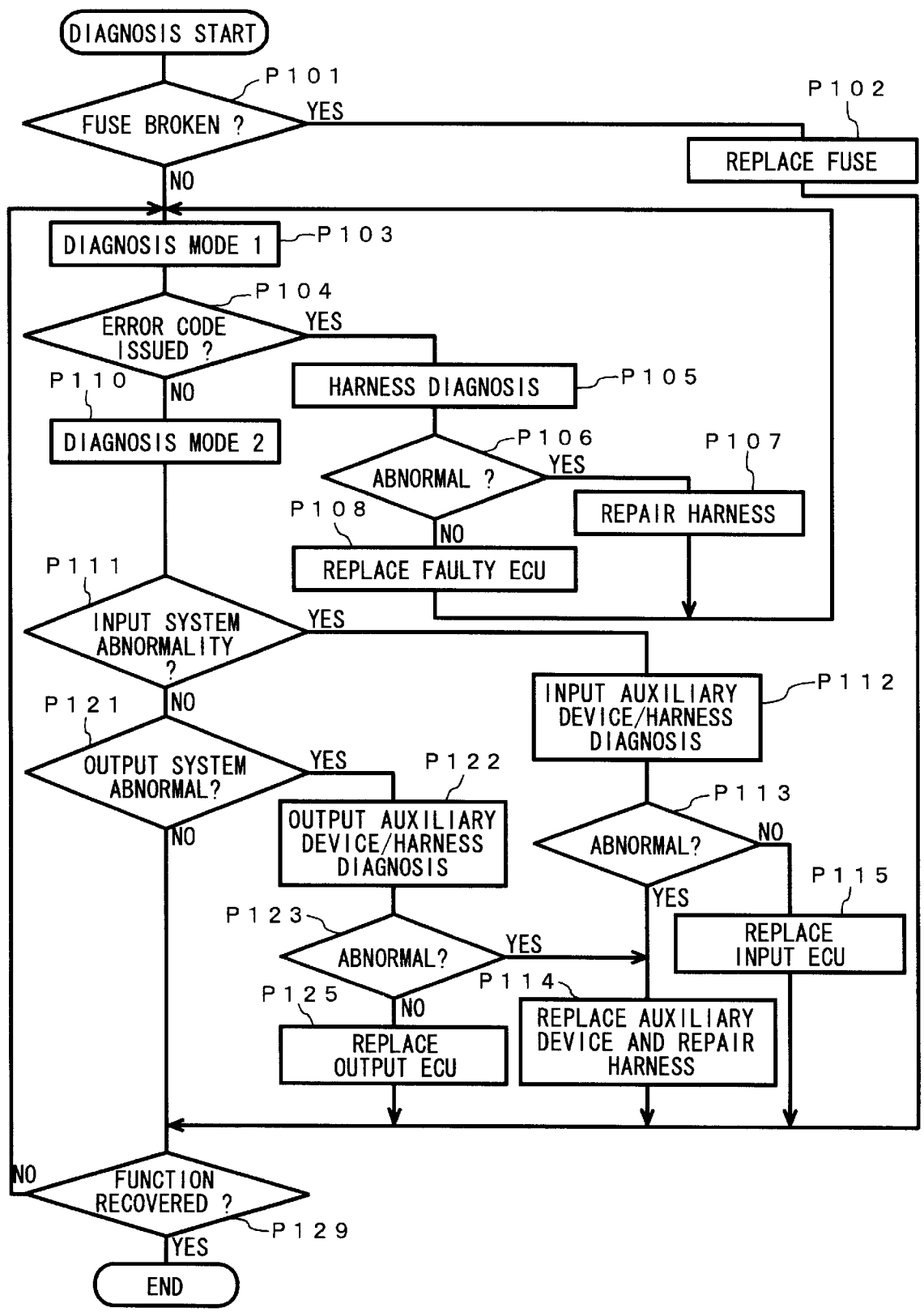
FIG. 3 is a flowchart showing a procedure of diagnosing the vehicle control communication network for the embodiment of the present invention.

FIG. 3 is a summary flowchart for diagnosing the vehicle control communication network in the embodiment of the present invention. The diagnosis operation starts when the diagnosis mode start switch 8 shown in FIG. 1 is closed (i.e., the coupler being connected). First, the operator examines visually or by application of test current whether a fuse is broken or not (at Step P101). If the fuse is broken, it is then replaced with a new one (P102). When a desired function remains not recovered (P129), the diagnosis mode 1 is commenced (P103). The diagnosis mode 1, which will be explained later in more detail, includes automatically checking with the use of a diagnosis program stored in each of the ECUs 10, 20, and 30 for fault in the transmitter and receiver in the corresponding ECU, abnormalities on any communication line 2, 4, or 6, and mismatching of the destinations (code) of the ECUs, and when any faults are found, issuing an error code indicative of the fault.

When the error code is issued in the diagnosis mode 1 (P104), the operator reads the code to determine the cause of the fault such as disconnection of the communication line (which is normally being pulled up), ground fault, or connector failure and carries out a necessary countermeasure (such as repair or replacement) according to a known conventional manner (S105 to S108). The means for issuing the error code may be the buzzer 15, the IG key light 25, and some other auxiliary output devices which are originally equipped in the network to be checked.

When no error code is presented in the diagnosis mode 1 (P104), the procedure goes to the diagnosis mode 2 (P110). The diagnosis mode 2, which will be explained later in more detail, allows the operator to selectively control the entry of desired targets to be diagnosed for examining the conditions of the inputs (including the switches, sensors, other auxiliary input devices, and their lead wires) and the outputs (including a wiper, head lights, the other auxiliary output devices, and their lead wires) of the ECUs by providing a dialogue with each ECU.

More specifically, when some particular switch selected and operated by the operator for diagnosis, which is one of the auxiliary input devices, is operated without fault, its operating (switch) signal is detected by the diagnosis/control device 13 or 23 of the ECU which, in turn, actuates the indicating means 15 or 25. This permits the operator to acknowledge that the switch or its input system to be diagnosed is normal. If the operating signal is not detected, the indicating means remains unactuated indicating that the input is not normal. In response to the condition of operation of any auxiliary input device, the indicating means is actuated in either "normal" or "abnormal" indicating mode. Also, an expected action of a corresponding output device in response to the actuation of the switch or input device is previously known to the operator and recognized through one of the five human senses, such as the visual sense of the operator. The condition of each target output system to be diagnosed can thus be examined with ease and at substantially the same time through monitoring the response action of the corresponding output device.

In this case, the output device as the indicating means may preferably be isolated from the action of the auxiliary input device to be diagnosed during the normal running operation of the vehicle so that misunderstanding (fault recognition) of the diagnosed result is prevented. More particularly, for example, if a particular headlight is used as means for indicating its own operational condition in the diagnosis mode and fails to be turned on with its switch being closed, it cannot be determined whether or not the input or output side system of the corresponding ECU has an error.

According to the present embodiment, in short, the operator, after selectively operating an auxiliary input switch to be diagnosed, can almost immediately judge the operating condition of the switch on the basis of action of the indicating means and/or the output device corresponding to the input switch. It can be determined that the condition of the input switch is normal when the indicating means is actuated in the predetermined manner. Simultaneously, it can be judged that the output device is normal if it actuates correctly as expected. If the output device actuates incorrectly with the input device being found normal, the output device is not normal. If the indicating means remains unactuated with the input switch being operated, it is judged that either the input device system or the corresponding ECU is abnormal. As a plurality of indicating means produce different kinds of stimulation or display mode signs such as light and sound, the judgment will be made with much ease and accuracy.

When any abnormal condition is indicated, the operator checks the input switches, devices, and relevant lead cables by a known conventional manner (manually measuring the potential and examining the conduction at each relevant location) (at Step P112 in FIG. 3). When a fault or defect is found, it is repaired or replaced (P113 and P114). If there is no sign of fault in the input devices and lead cables, the corresponding input ECU is replaced with new one (P115).

For example, when the wiper switch of the vehicle is selected as a target and operated by the operator for examining its operating condition in the diagnosis mode 2, the normal transmission of its operating signal is judged by the actuation of the indicating means 15 and 25 (emitting a buzzer sound and a light, respectively). Simultaneously, the motion of the wiper is observed and its operating condition is judged by the observed movement of the wiper (P121). If the wiper does not move, its related auxiliary output devices (including a wiper motor, a transmission, a wiper body, etc), their lead cables, and the corresponding ECU are manually examined by a known manner (P122). If a fault or defect is found, it is repaired or replaced (P123 and P114).

For diagnosing headlights, as another example, their switch is turned on. When the relevant indicating means remains unactuated and the normal operation of turning on of the switch is not determined, it is hence judged that the switch, its lead cable and/or the corresponding ECU is not normal. When the action of the switch is found normal, the headlights themselves are visually examined. If the headlights remain unactuated, the headlights themselves, their assembly and lead cables are examined for a defect, disconnection, or a shortcircuit. If no failure is detected in the switch, lead cables and so on, the corresponding ECU (for example, the output ECU) is replaced with new one (P125). Then, when the predetermined function is recovered, the procedure of diagnosis and repair is terminated. If not, however, the procedure starting from P112 or P103 is repeated.

The present invention provides a distinctive and ingenious combination of the diagnosis mode 1 in which the diagnosis on fault in the communication lines (and conformity of the specifications of the ECUs and the destinations) is automatically performed by the ECUs using the prestored program and the communications between the control units, and the diagnosis mode 2 in which the diagnosis on fault of the input and output lines and devices is selectively carried out by the operator manually operating the auxiliary input device to be diagnosed while making dialogues with the corresponding ECU. This allows, therefore, the operator to select and diagnose a desired one of the auxiliary input/output devices and control systems, thus ensuring a higher rate of the diagnosing efficiency and decreasing the overall cost of the diagnosing action.

In addition, the number of locations (and their types) of the fault found in either of the diagnosis modes 1 or 2 is minimized, thus reducing the required number of the indicating means and contributing to the simplification of the drive controlling method. For example, the fault locations which are identified in the present embodiment are the transmitter circuits, the receiver circuits, the communication processing function of each ECU, and the communication lines between the control units in the diagnosis mode 1, while the control processing function of each ECU, the auxiliary input devices, and the auxiliary output devices in the diagnosis mode 2. Since the number of items and/or types to be indicated is rather less in each diagnosis mode as mentioned above, the operator does not have any difficulty to read and discriminate the signs on the indicating means which are even energized in the coded form. Accordingly, the indicating means to be used can be minimized in number. In the prior art, on the contrary, there must be a large number of the items and/or types of diagnosis result, when a vehicle is automatically diagnosed. Therefore, it will be required for indicating the diagnosis result so as to be easily discriminated by the operator to provide a large number of indicating means for giving a unique indication for each diagnosing result or to display each diagnosing result in an elaborate message form on the indicating means. Accordingly, the complicated process and increase of the overall cost will hardly be avoided.

Figure 4:
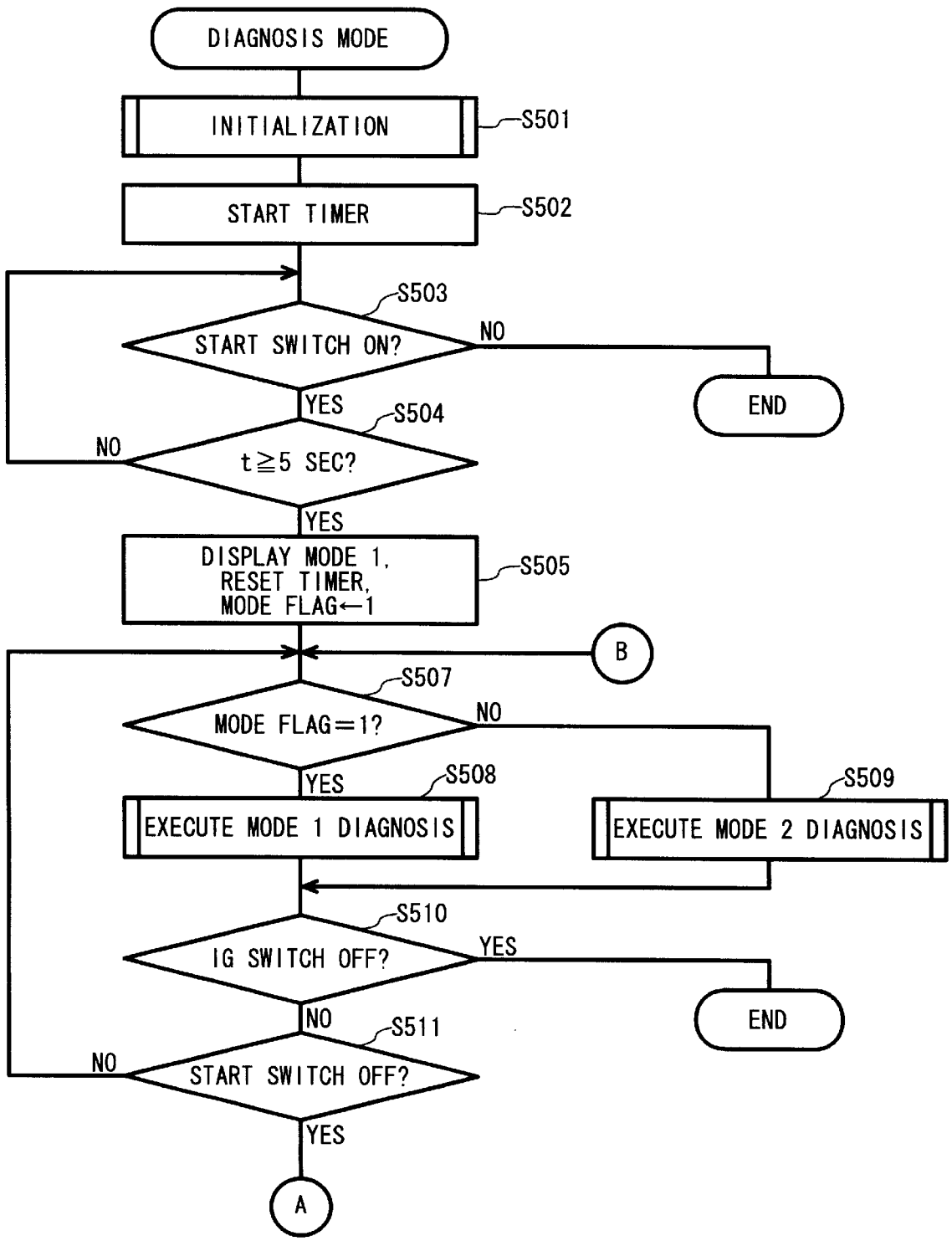
FIGS. 4 and 5 are main flowcharts showing a procedure of diagnosis in each ECU.
Figure 5:
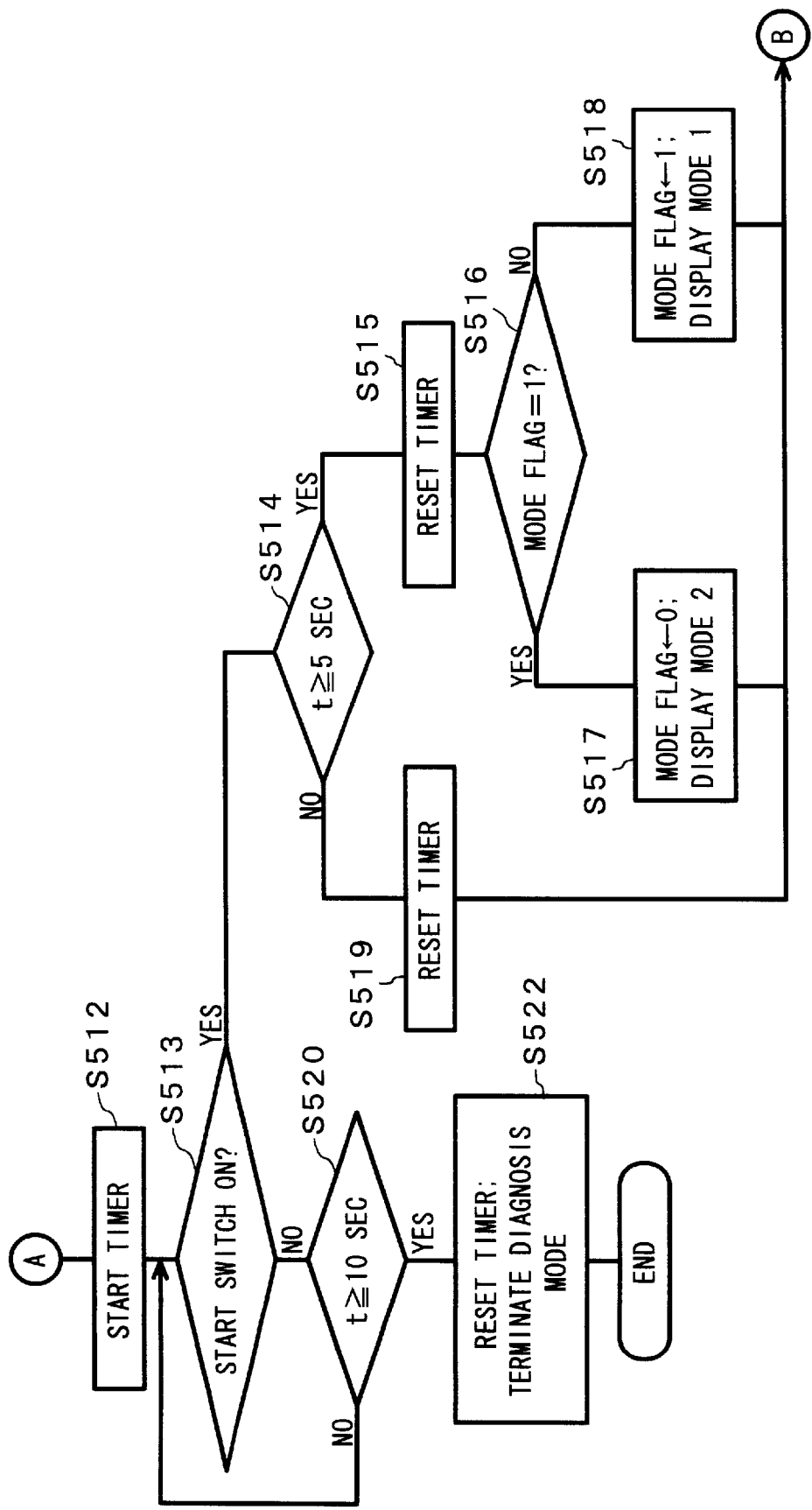
Figure 6:
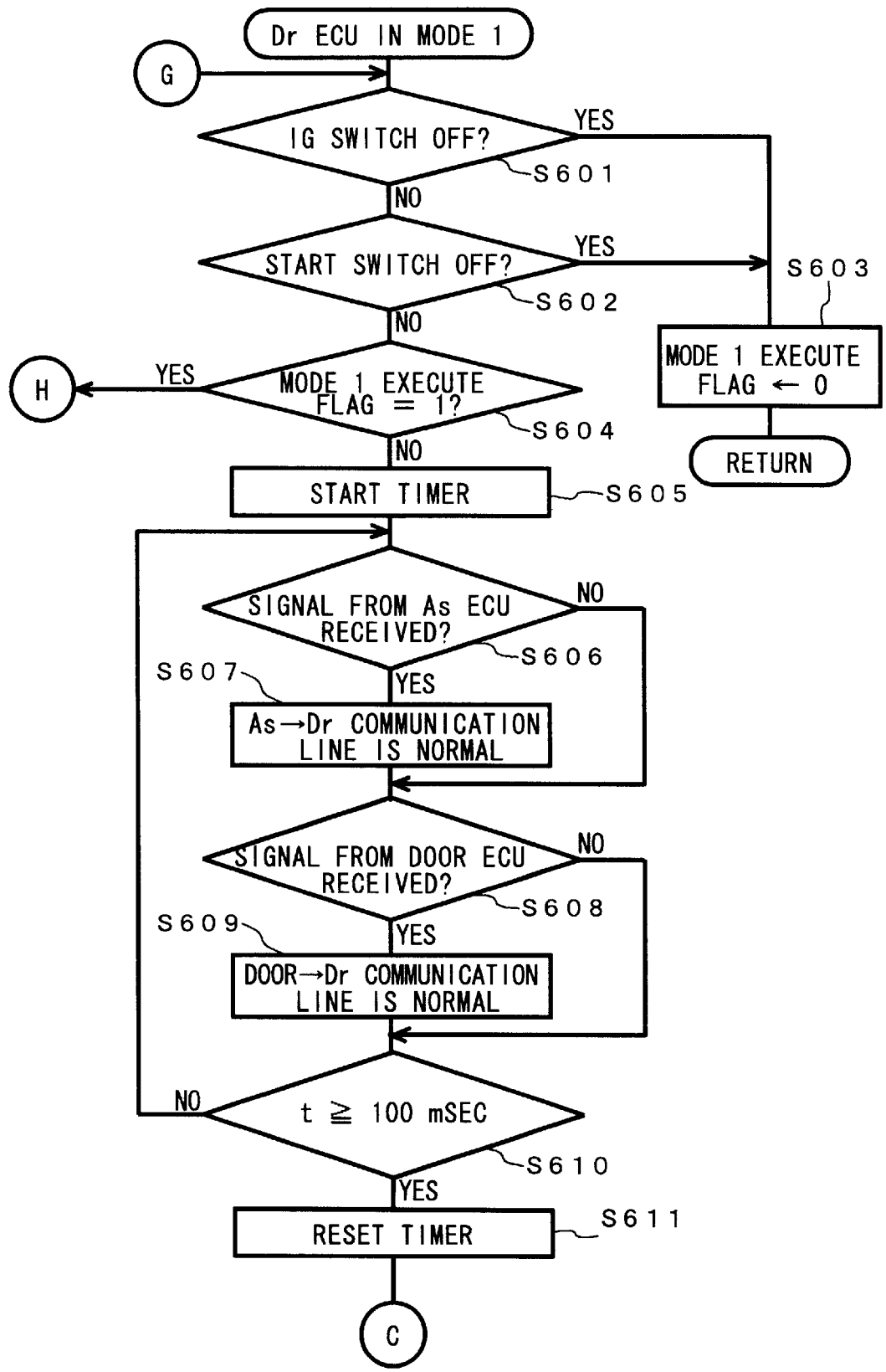
FIGS. 6 to 9 are flowcharts showing steps of the diagnosis mode 1 in the Dr ECU of the embodiment.
Figure 7:
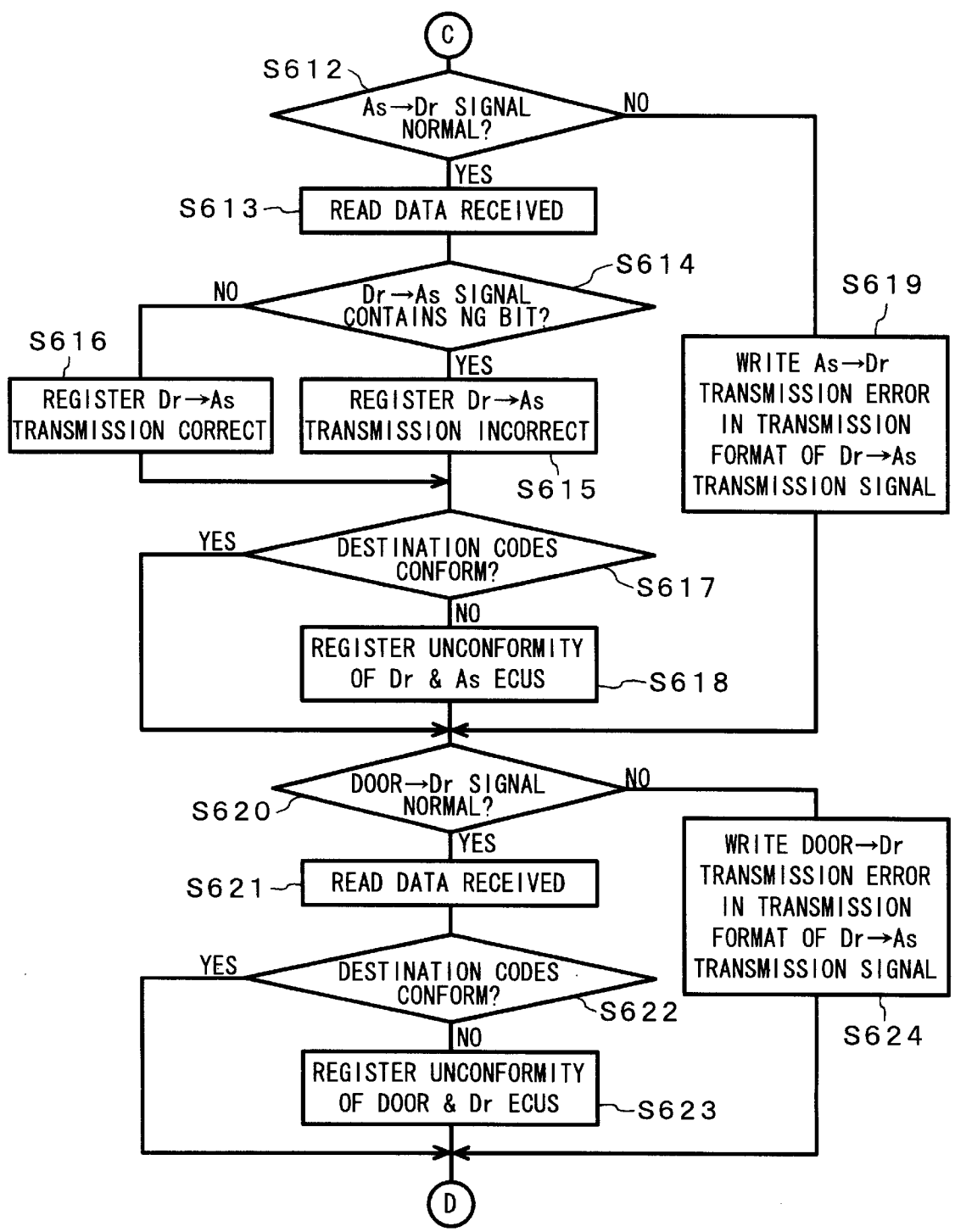

FIGS. 4 and 5 are a main flowchart showing a procedure of diagnosis in each ECU. It should be noted that the following explicit numerals representing the setting of a timer are used only for ease of the explanation and not limitative of the present invention. When the start switch 8 shown in FIG. 1 is closed (i.e. the diagnosis mode start coupler is connected in the embodiment), the diagnosis mode starts up. After the initializing process has been done (at Step S501), the timer is switched on (S502). When it is judged at Step S504 that five seconds have elapsed, the timer is reset with the operation mode being switched to the diagnosis mode 1 and the mode flag being set to 1 and, if desired, these operations are displayed (S505). If the start switch is disconnected before counting five seconds, the procedure is terminated without starting the diagnosis mode (S503).

The mode flag is then examined at Step S507. When the mode flag is 1, the diagnosis mode 1 is executed and if it is 0, the diagnosis mode 2 is carried out. After the execution of any one of diagnosis modes is completed, it is examined whether the IG switch is turned off or not (S510). If yes, the procedure is terminated. When the IG switch is not turned off, it is examined whether the start switch 8 is disconnected or not (S511). If not, the steps S507 to S511 are repeated. When it is judged at Step 511 that the start switch 8 is turned off, the timer is started again (S512) and the re-closing of the start switch 8 is monitored (S513).

When it is judged that the start switch 8 is closed again, it is examined whether or not five seconds have elapsed (S514). If not, the timer is reset (S519) and the procedure goes back to Step S507. When it is judged at Step S514 that the timer has counted up five seconds, the timer is reset (S515) and it is then examined whether the mode flag is 1 or not, i.e., which of diagnosis mode 1 and 2 is selected (S516). After the diagnosis mode is shifted from 1 to 2 (S517) or from 2 to 1 (S518), the procedure returns to S507 for starting the newly selected diagnosis mode. Meanwhile, when ten seconds have elapsed with the start switch 8 being opened but not closed again (S520), the timer is reset to cancel the diagnosis mode and terminate its procedure (S522).

During execution of the diagnosis mode, the ECUs 10, 20, and 30 repeatedly deliver their unique signals of the predetermined format from their transmitters in, e.g., a packet transmission method. The unique signals are received by the receivers 11 and 12 of the As ECU 10 and the Dr ECU 20. The unique signal commonly includes the result of diagnosis from each ECU, information about the normal and correct receipt of a unique signal from other ECU(s) to the intra-ECU, destination data of the transmitter ECU, error of transmission from other ECU(s) to the intra-ECU, data of destination code unconformity of any other two ECUs, and operating signals for the auxiliary input devices of the intra-ECU. In addition, the signal transmitted from the Dr ECU 20 to the As ECU 10 may carry an abnormality in the communication lines from As to Dr ECU and from Door to Dr ECU, destination code of the intra-ECU, switch input signal to the Door and intra-ECUs, service check bits, and so on. The signal transmitted from the As ECU 10 to the Dr ECU 20 may carry an abnormality in the communication line from Dr to As ECU, destination codes of the ECUs, switch input signal to the intra-ECU, service check bits, and so on. The signal transmitted from the Door ECU 30 to the Dr ECU 20 carries the destination code of the Door ECU, switch input signal to the intra-ECU, and so on. The service check bits may represent the unconformity of the destination codes of the ECUs in the diagnosis mode 1, while the generation of switch input signal to the intra-ECU in the diagnosis mode 2.

The unique signal in the present embodiment is an NRZ signal having a frame which comprises a start bit ST, a string of 1-bite data bits D0 to D7, a parity bit PR, and a stop bit SP, as shown in FIG. 20. Each packet includes data frames of the appropriate number of bytes and a check sum frame allocated at the rear end. The data of abnormality in the communication line between the ECUs, destination code, and service check bits may be saved, for example, in the 0 data frame allocated at the front end. In this embodiment, the transmitter of one ECU and the receiver in another ECU are fixedly connected to each other on a one-to-one basis. It is hence easily understood that the unique signal need not carry any control unit ID data indicative of the sending transmitter or the addressed receiver. The construction of such a frame and a packet are well known and will not be explained in further detail.

The execution of the diagnosis mode 1 (S508) in the main flow shown in FIGS. 4 and 5 will now be explained. The transmission and receipt of signals in each ECU are (asynchronously) triggered by interruption with the timer and with the start bit ST in a received signal, respectively. FIGS. 6 to 9 are flowcharts showing a procedure of the Dr ECU 20 in the diagnosis mode 1.

First, it is determined whether or not the IG switch and the start switch are disconnected (S601 and S602). If any of the switches is disconnected, the flag for the diagnosis mode 1 is set to 0 (representing non-execution of the diagnosis mode 1) and the procedure moves back to the main flow shown in FIGS. 4 and 5 (S603). When both of the two switches are closed, it is determined whether or not a diagnosis mode 1 execution flag is 1, that is, whether the diagnosis mode 1 has been completed (S604). As it is judged "not" at first, the timer starts up (S605). It is then determined whether or not the unique signals are received from the As ECU 10 and the Door ECU 30 (S606 and S608). When yes, the communication lines between the corresponding ECUs are normal and those informations are registered (S607 and S609). When the steps S606 to S609 are repeatedly processed for 100 milliseconds (S610), the timer is reset (S612). It can be judged that the communication lines are normal when the unique signals are received more than a predetermined number of times within said 100 milliseconds.

When the signal is correctly received from the As ECU 10 (S612), its (unique) data is read (S613). It is then determined whether or not the unique signal from the Dr ECU 20 contains any NG bit (S614). If yes, it is registered that the transmission from the Dr ECU 20 to the As ECU 10 has an error (S615). When no NG bit exists, it is registered that the transmission is correctly done (S616). It is determined whether or not the destination codes of the As and Dr ECUs conform to each other (S617). If not, their unconformity is registered (S617). When it is judged at Step S612 that the transmission from the As ECU 10 to the Dr ECU 20 is erroneous, As to Dr transmission error data is written into the predetermined bit location in the transmission data format of the signal from Dr ECU 20 to the As ECU 10 (S619). The destination code will be explained later in more detail referring to FIG. 19.

When the signal from the Door ECU 30 has correctly been received (S620), in other words, said signal is not erroneous, the data received is read in (S621) and then it is determined whether or not the destination codes of the Door and Dr ECUs conform to one another (S622).

If not, their unconformity is registered (S623). When it is judged at Step S620 that the transmission from the Door ECU 30 to the Dr ECU 20 is erroneous, Door to Dr transmission error data is saved in the predetermined bit location of the transmission data format of the signal from the Dr ECU 20 to the As ECU 10 (S624).

The diagnosis mode 1 is now completed and followed by a procedure from S630 to S641 of classifying the results of diagnosis and a procedure from S649 to S659 of displaying the condition (normal or abnormal) of the communication lines and/or the unconformity between the destination codes of the ECUs. Then, the completion of the diagnosis mode 1 is registered or the flag is set to 1 (S660) before the procedure moves back to S601. The procedure then jumps from S604 to S630. Hence, the diagnosing operation is notch carried out an, further but its results are continuously displayed.

Figure 8:
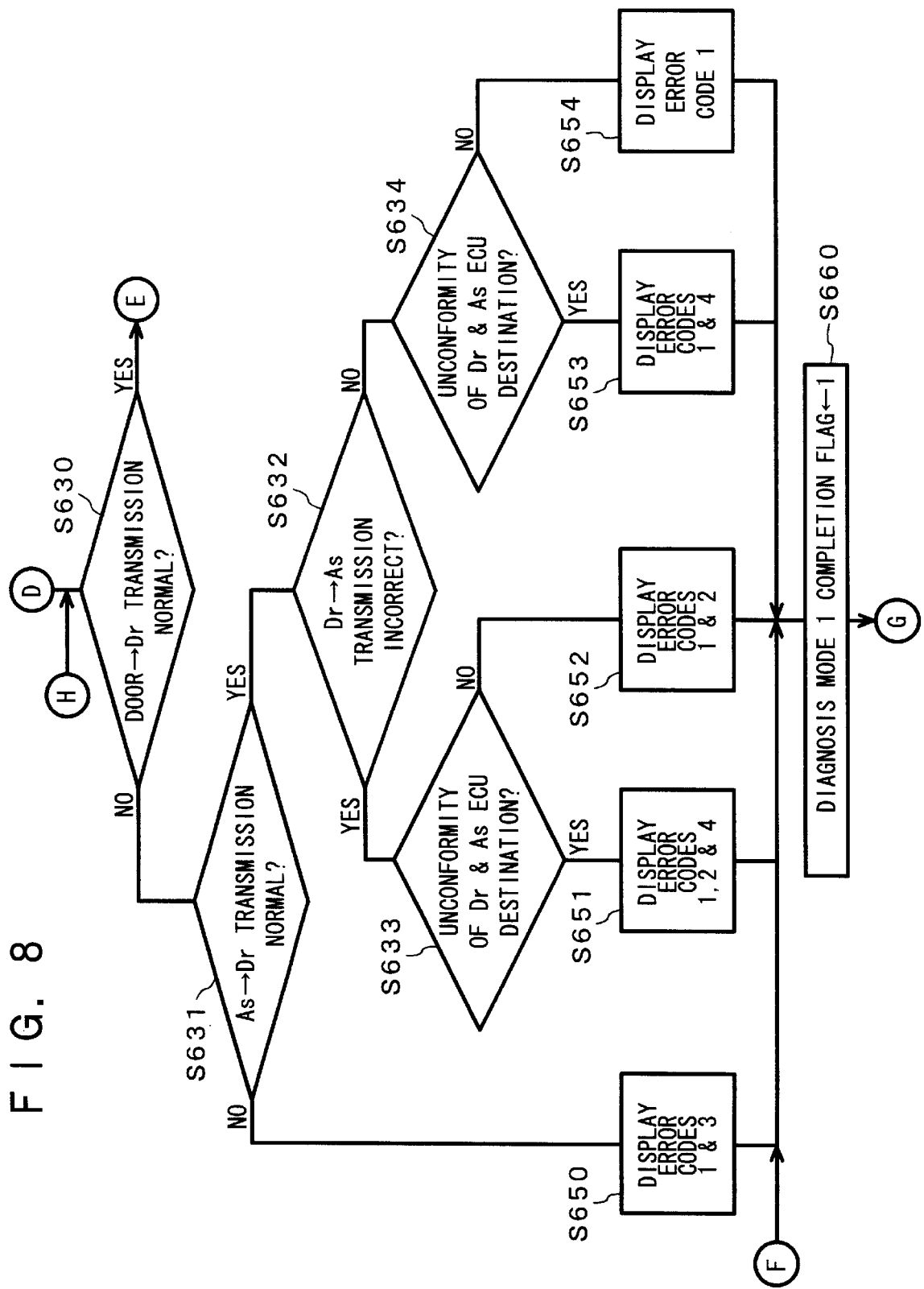
Figure 9:
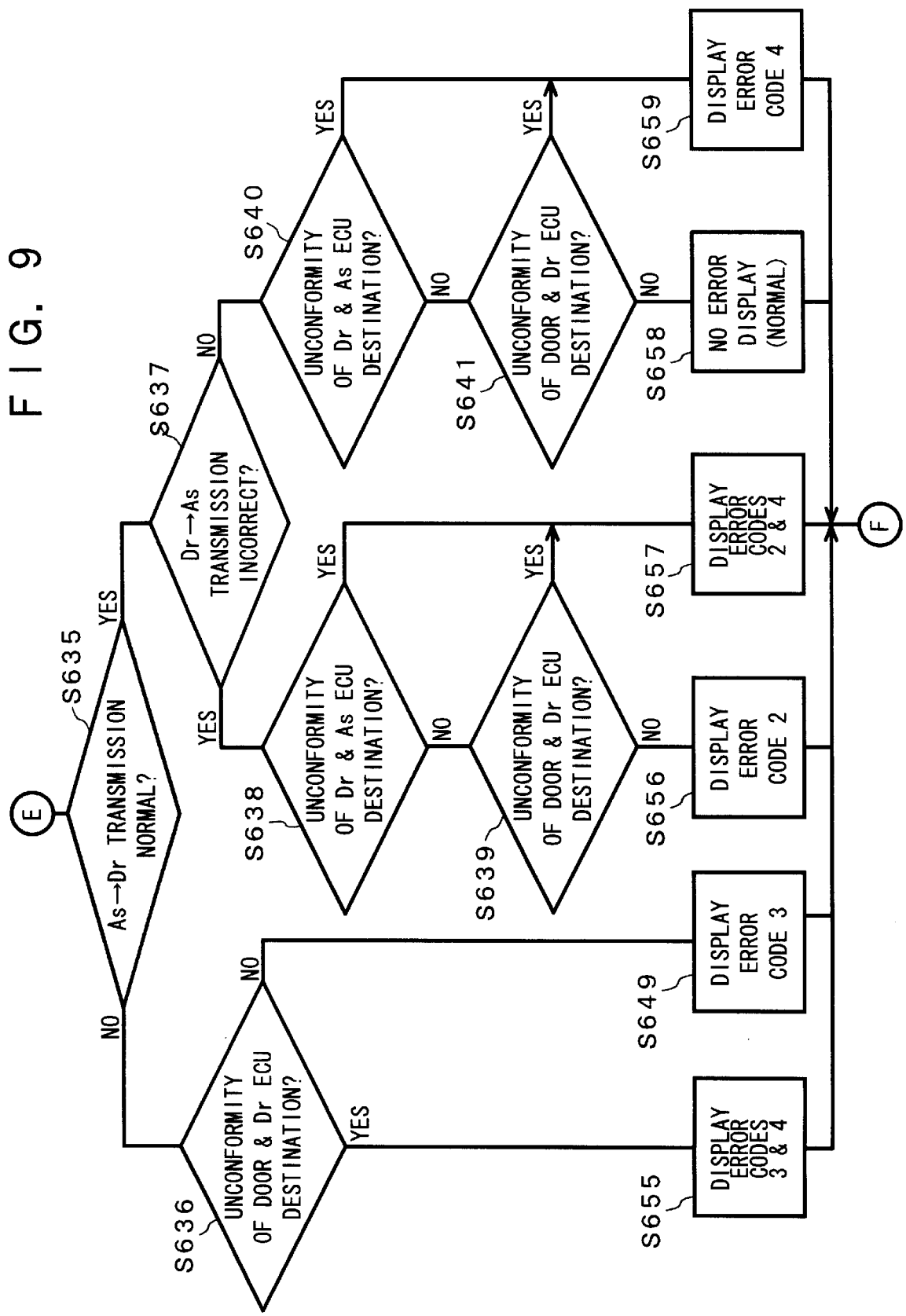

The display of the results of diagnosis is performed by using predetermined coded pulse signals applied to the indicating means 15 and 25 in FIG. 1. As shown in FIGS. 8 and 9, three kinds of error codes 1 to 3 of the error indication are assigned to the #1, #2, and #3 communication lines of FIG. 1, respectively, and an error code 4 is indicative of the unconformity of the ECU destinations. The display of no code means that the diagnosis mode 1 has detected no error. For displaying two or more codes on the indicating means 15 and 25, those codes may be indicated in succession with intervals of a given time or each combination of error codes may be assigned to a predetermined unique pulse code.

Figure 10:
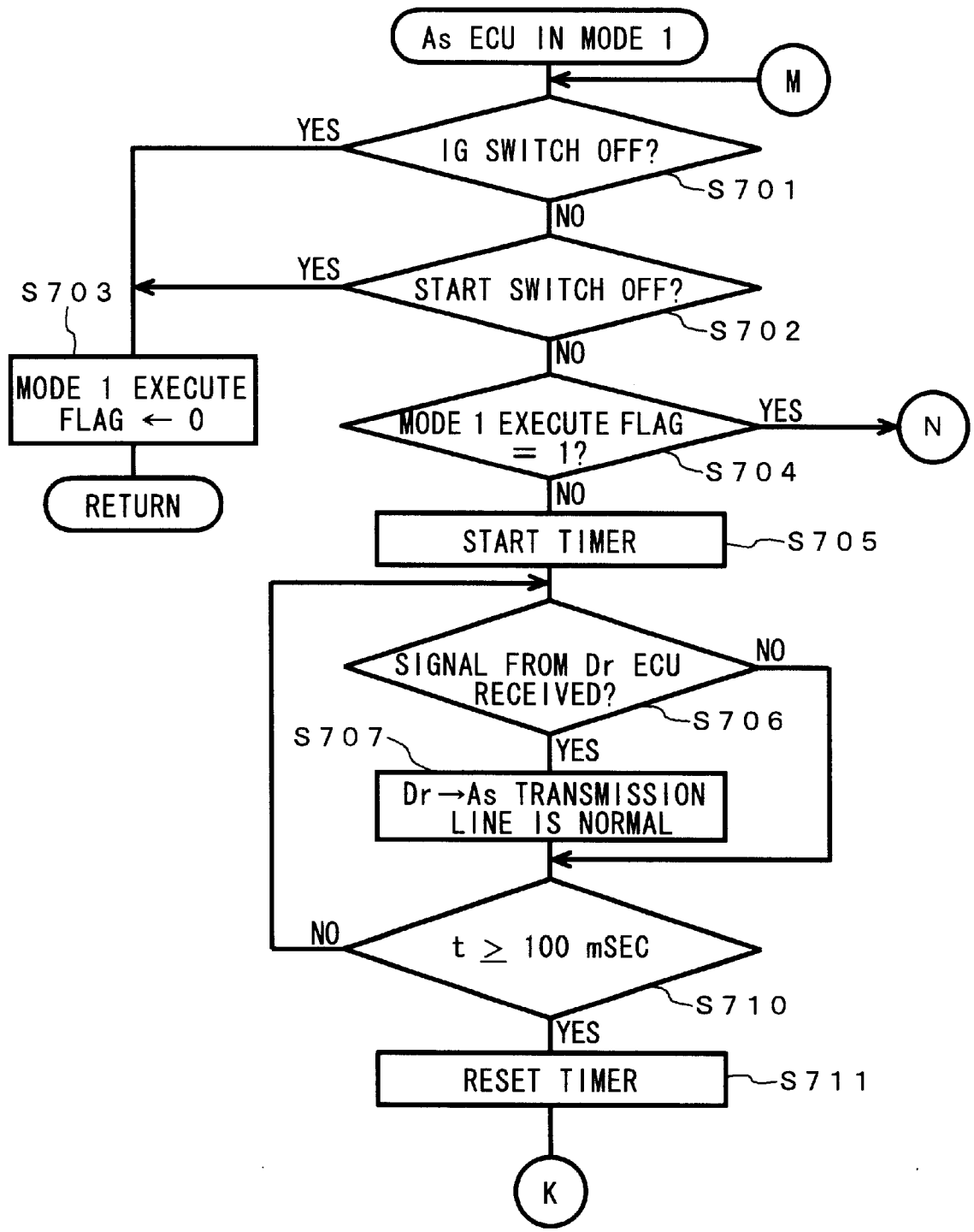
FIGS. 10 to 12 are flowcharts showing steps of the diagnosis mode 1 (FIG. 3) in As ECU.
Figure 11:
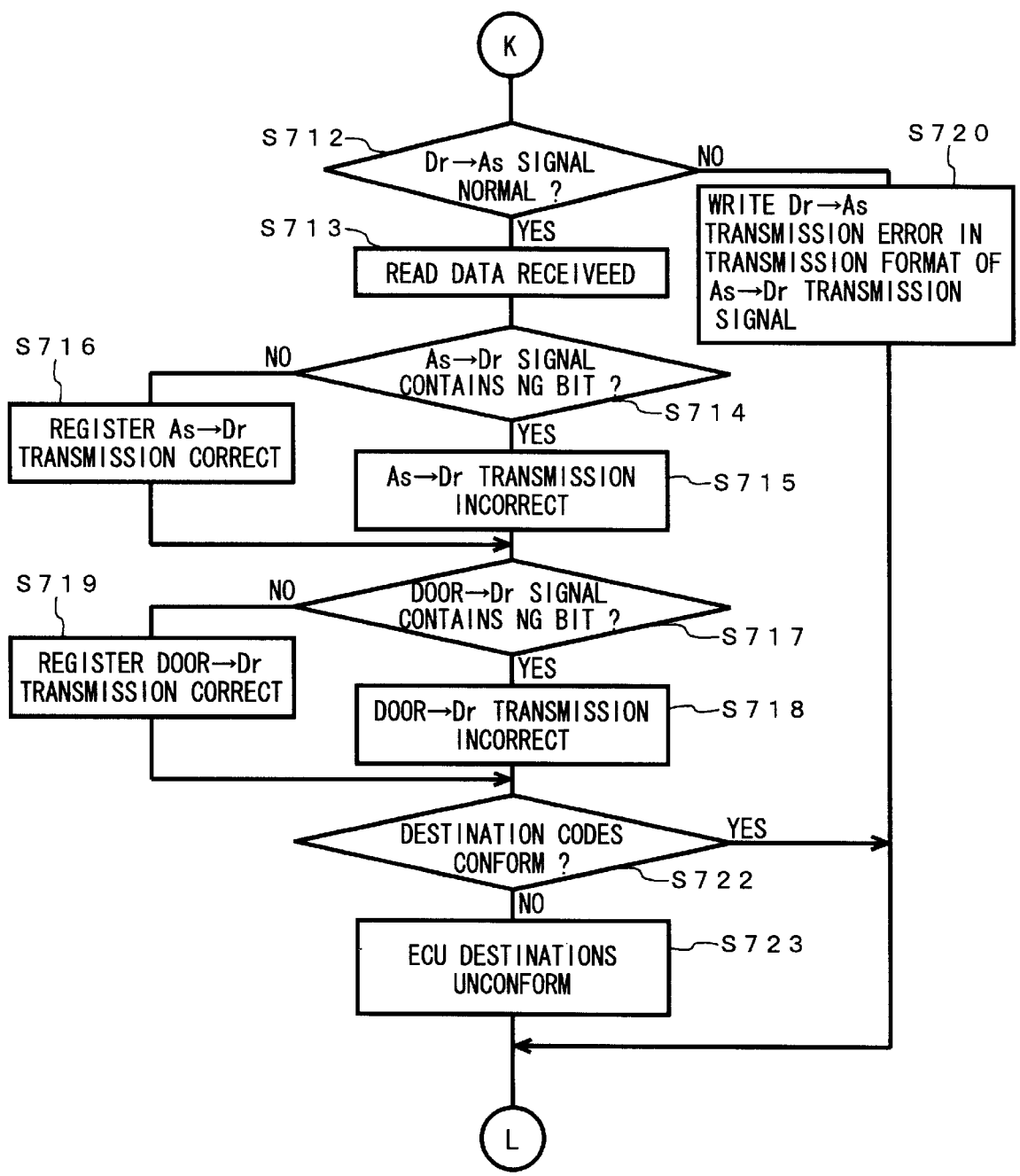
Figure 12:
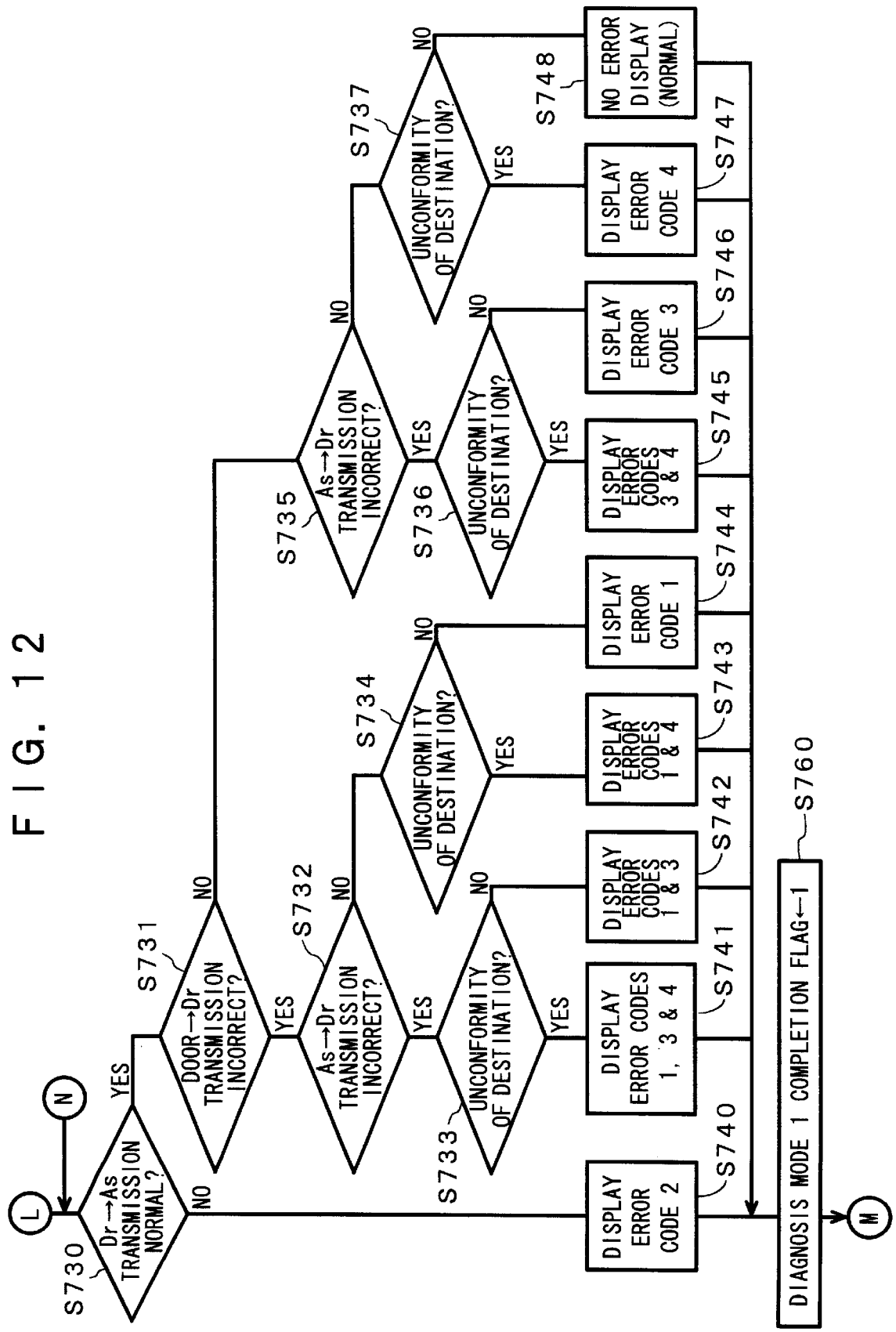

FIGS. 10 to 12 are flowcharts showing a procedure of the diagnosis mode 1 in the As ECU 10. As is apparent, the steps S701 to S705 are identical to S601 to S605 shown in FIG. 6. It is determined at Step S706 whether or not the signal from the Dr ECU 20 is received or not. When yes, the communication line between the two ECUs is normal and its fact is registered (S707). When the steps S706 and S707 have been repeated for 100 milliseconds (S710), the timer is reset (S711). If the signals are received more than a predetermined number of times in the period of 100 milliseconds, it is judged that the communication line is normal.

When the signal from the Dr ECU 20 has correctly been received (S712), its (unique) data is read (S713) and it is determined whether or not the signal contains any NG bit (S714). If any NG bit is found, the transmission from the As ECU 10 to the Dr ECU 20 is not normal and this fact is registered (S715). When no NG bit exists, the transmission is normal and this fact is registered (S716). It is also determined whether or not the unique Door to Dr ECU signal in the unique signal transmitted from the Dr ECU 20 carries any NG bit (S717). If any NG bit exists, the transmission from the Door ECU 30 to the Dr ECU 20 is not normal and this fact is registered (S718). When no NG bit is found, it is registered that the transmission is normal (S719). It is examined whether or not the destination codes of the As and Dr ECUs conform to each other (S722). If not, their unconformity is registered (S723). When it is judged at Step S712 that the transmission from the Dr ECU 20 to the As ECU 10 is not normal, Dr to As transmission error data is saved in a predetermined bit location of the transmission data format of the signal from the As ECU 10 (S720).

The processing of the diagnosis mode 1 is now completed and followed by a procedure S730 to S737 of classifying the results of diagnosis and subsequent procedure S740 to S748 of displaying the condition (normal or abnormal) of the communication lines and the unconformity of the ECU destinations in code forms. Then, the completion of the diagnosis mode 1 is registered (S760) before the procedure returns back to Step S701. As the procedure jumps from S704 to S730 thereafter, the diagnosing operation is not repeated further but the display of the results of diagnosis is continued.

When the results of the diagnosis mode 1 are indicated, it is efficient for the operator to check the presence or absence of fault in each relevant location or ports in the order shown as an example in FIG. 13, according to the combination of error codes displayed. More particularly, when both the buzzer 15 and the IG key light 25 of the system shown in FIG. 1 are actuated with the error code 2, it is determined that the best procedure of identifying the error location utilizes the #2 communication line 4, the Dr ECU 20, and the As ECU 10 in that order. If the destination unconformity (code 4) is presented, each ECU with fault destination is replaced with a correct one.

FIG. 14 is a flowchart showing a procedure of the diagnosis mode 2 in the Dr ECU 20. The procedure starts with examining whether or not the IG switch and the start switch 8 are turned off (S801 and S802). If at least one of the switches is off, the procedure goes back to the main flow shown in FIGS. 4 and 5. When the two switches are closed, it is followed in sequence by examining logics of whether or not the intra-ECU or Dr ECU is loaded with an operating (ON) signal of its auxiliary input device or switch (S803), whether or not the analog input (from, e.g., a sensor) to the intra-ECU exceeds a predetermined threshold (S804), whether or not the pulse input (from e.g. a running speed sensor) to the intra-ECU exceeds a predetermined threshold (S805), and whether or not the signal received from the Door ECU 30 carries switch operating data (S806).

In the diagnosis mode 2 mentioned above, the error detection is performed by two major sequences of examining the presence or absence of fault in the input and output systems and, if any fault has been found, determining that the location of the fault is either on the input or output system. More particularly, when the presence of fault is detected, its location can be almost simultaneously identified. For example, in a case of fault in which the wipers fail to be actuated with the wiper start switch is turned on, the diagnosis mode 2 judges on the basis of an one-second performance of both the buzzer 15 and the IG key light 25 that the input system of the ECU extending from the associated wiper start switch has no fault but the output system and/or the wiper motor is defective. On the contrary, it judges on the basis of no responsive action of the buzzer 15 and the IG key light 25 that the input system extending from the start switch has a fault. Accordingly, the efficiency of the diagnosis procedure will be improved. The values of the thresholds will be explained later in more detail referring to FIGS. 15 and 16.

If any of the prescribed steps S803 to S806 provides "yes", the service check bit in the transmission data format of the signal from the Dr ECU 20 to the As ECU 10 is set for one second and the IG key light 25 which is an indicating means therefor is illuminated for the same one second (S807). It is then determined whether or not the service check bit of the data format of the signal received from the As ECU 10 is set to 1 (S808). If so, the IG key light 25 is turned on for one second for its indication (S809).

FIG. 15 illustrates the relation between analog input, threshold, and timing for driving the indicating load. For example, when the control knob for wiper driving speed is turned, its output (i.e. an input voltage to the Dr ECU) varies with time as shown in the Figure. It is assumed now that ¼, ²⁄₄, and ¾ of the maximum voltage input to the Dr ECU are defined as threshold values. Upon the input voltage exceeding the threshold values, the indicating load (i.e. the buzzer 15 or the IG key light 25) is actuated for one second. This allows the operator to judge that the input system of the wiper driving speed control is normal if the indicating load is actuated at expected intervals when the control knob is turned on for its diagnosis by the operator.

FIG. 16 shows the relation between pulse input, threshold and timing for driving the indicating load. It is now assumed for the vehicle speed sensor (a vehicle speed pulse input system) as an object of the diagnosis that frequency values of the pulse generated by the sensor, which respectively correspond to 10, 20, and 30 km/h of the vehicle speed, are predetermined as threshold values. Upon the frequency (period) of the output pulse generated by the vehicle speed sensor reaching or passing any of the threshold values, the indicating load (i.e. the buzzer 15 or the IG key light 25) is actuated for one second. This allows the operator to judge that the vehicle speed sensor is normal if the indicating load is actuated at expected intervals during the acceleration or deceleration of the engine.

Figure 17:
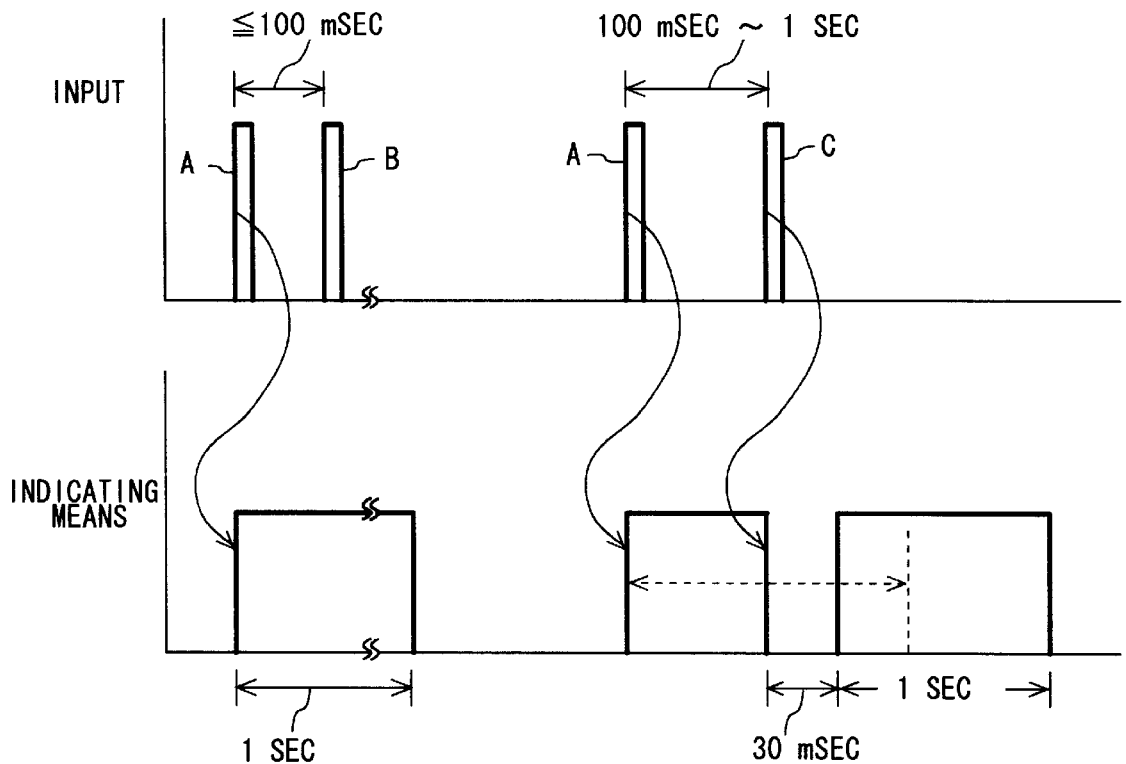
FIG. 17 is a diagram showing the actuation of indicating load when input signals are continuously detected in the diagnosis mode 2.

In the diagnosis mode 2, the operator performs diagnosing actions by successively operating switches and control knobs. Depending on the speed and/or frequency of the switching or controlling operation, the duration from the time the analog/digital input has passed a threshold to the time it reaches the next one or the interval between two successive switch signal inputs may be less than a predetermined time of the indicating load actuating one second. This causes overlap of the indications thus leading to misjudgment of the operator. For a counter-measure thereof, the present embodiment permits any signal input A to be not affected by the succeeding signal input B which follows within 100 milliseconds, as shown in FIG. 17. More particularly, the succeeding signal input B is not indicated. If the succeeding signal input C is given within a range from 100 milliseconds to 1 second, the indication of the first input signal A is extinguished and, after an interval of 30 milliseconds, the succeeding signal input C is indicated for one second. Accordingly, two successive inputs A and C are indicated in succession.

Figure 18:
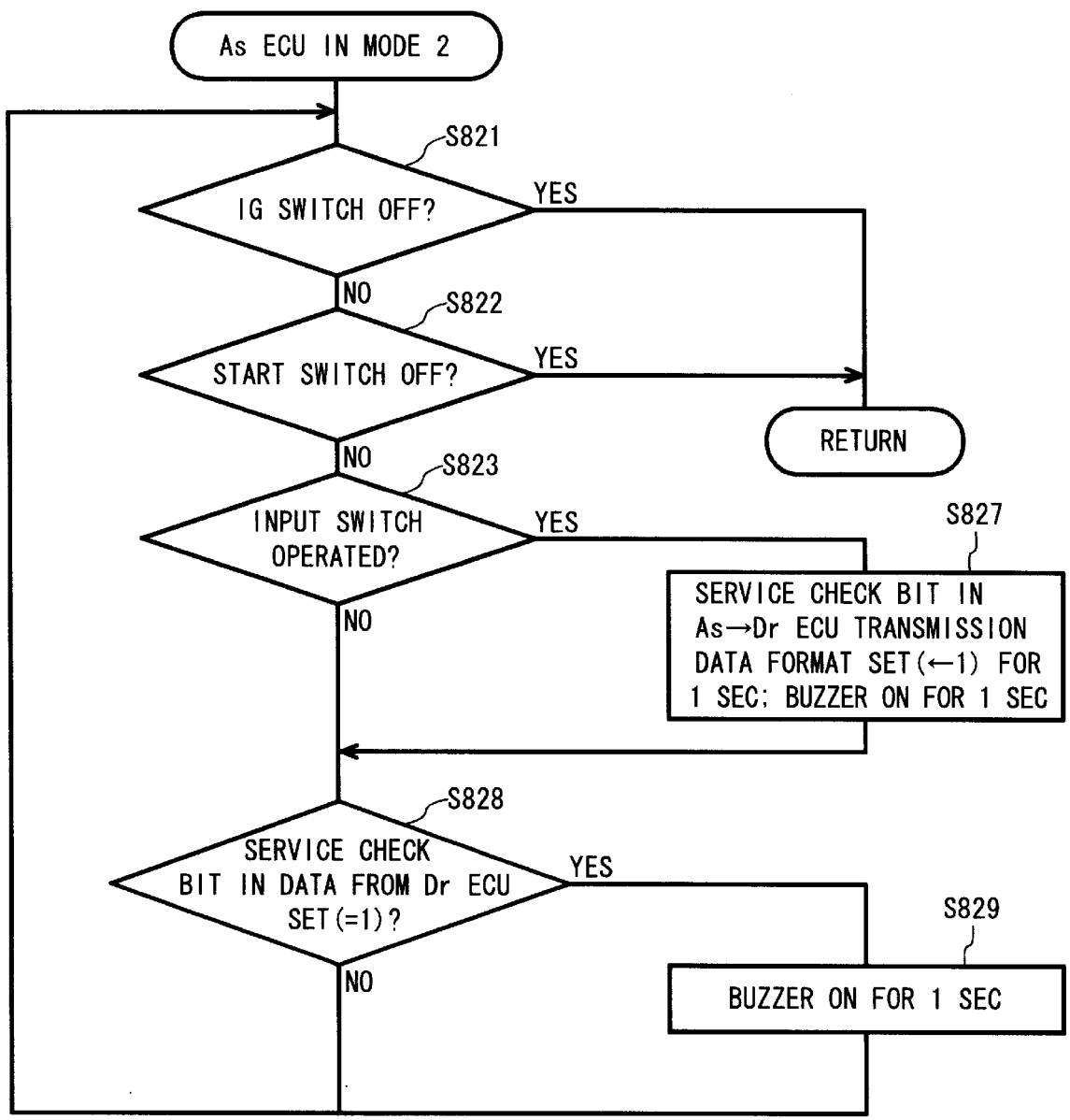
FIG. 18 is a flowchart showing steps of the diagnosis mode 2 (FIG. 3) in the As ECU.

FIG. 18 is a flowchart showing a procedure of the diagnosis mode 2 in the As ECU 10. Similar to the procedure in the Dr ECU 20, the procedure starts with determining whether or not the IG switch and the start switch 8 are turned off (S821 and S822). If either of the two switches is disclosed, the procedure moves back to the main flow shown in FIGS. 4 and 5. When both of the two switches are connected, it is then determined whether or not the operating (ON) signal from any input switch auxiliary with the intra-ECU is received (S823). When yes, the service check bit in the transmission data format of the signal from the As ECU 10 to the Dr ECU 20 is set for one second and simultaneously, the indicating load or the buzzer 15 is actuated for one second (S827). This is followed by determining whether or not the service check bit in the data format of the signal received from the Dr ECU 20 is (set to) 1 (S828). When the bit is 1, the buzzer 15 is actuated for one second (S829).

As is apparent from the above-mentioned explanation, the preferred exemplary embodiment of the present invention allows, in both of the diagnosis modes 1 and 2, the diagnosis results in both the As ECU 10 and the Dr ECU 20 to be indicated in an analytic state (ON and OFF) and in different kinds of stimulus (emitting a series of flashing lights and an intermittent buzzer sound). Accordingly, the chance for misjudgment in the diagnosis results will be minimized. Also, if the results of diagnosis are indicated only over one ECU, it can be judged that the indicating means of the other ECU is defective. In case that the diagnosing process is carried out under a noisy or brighter condition, the indication of at least one of the two indicating means can successfully be perceived, hence preventing misjudgment and misunderstanding of the diagnosis results.

In the diagnosis mode 1, the ECUs are automatically operated by the programmed algorithm for determining the relations between the control units (i.e., fault in the communications between the units and the unconformity of the units to each other in the specification and destination). In the diagnosis mode 2, the auxiliary input device of interest is operated by the operator and it is judged by one of his five senses whether or not the indicating means and auxiliary output devices corresponding to the input device are correctly or expectedly actuated. This allows the overall arrangement and function to be simplified and examined by the diagnosis modes with much ease and readiness.

Figure 19A:
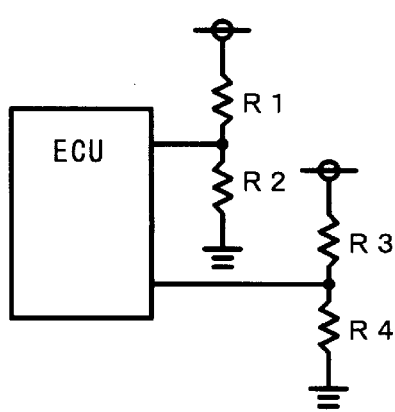
FIG. 19A is a view of a circuitry arrangement for producing the destination code and FIG. 19B is a truth table for determining the destination code with the circuit shown in FIG. 19A.
Figure 19B:
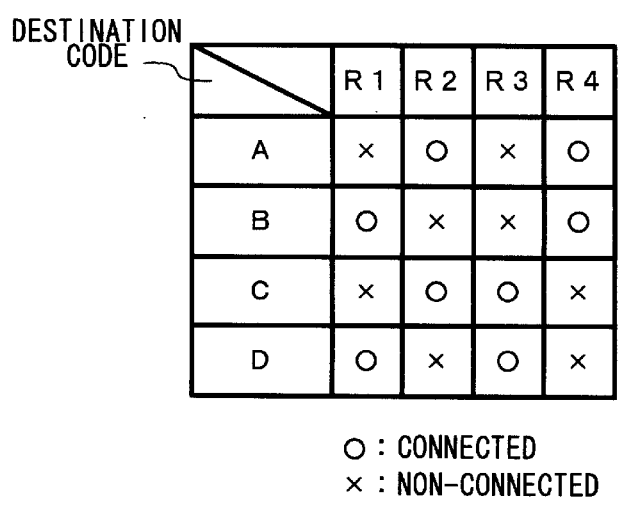

FIGS. 19A and 19B are diagrams showing a schematic circuitry arrangement for setting the destination code and an exemplary truth table for identifying the destination. As shown in the block diagram of FIG. 19A, two inputs of the ECU are respectively connected to two pairs of voltage dividing resistors R1, R2 and R3, R4. Each combination of the two resistors is assigned to one destination code in the truth table of FIG. 19B. This permits the destination code to be determined by detecting the potentials on the two inputs of the ECU. Alternatively, the destination code may be specified by examining each value or a combination of the values of the resistances connected to the two inputs of the ECU.

According to the present embodiment, the diagnosis is shifted to mode 2 after the mode 1 process has been completed. The diagnosis mode 1 examines the function of the communication between the control units which is essential for the performance of the communication network as well as the discrepancy of the specification and destination between the control units. It can be expected that it is more efficient to diagnose at first the condition of the essential function of which fault may affect broader parts of the apparatus. For example, if the communication function between the control units is not normal, the operation of the input and output systems will not be able to be normal. It is apparent, therefore, that when the communication function which is an essential function is not normal, the input and output systems are hardly diagnosed for finding a fault location even if the input or output system is attempted to be firstly diagnosed.

It is possible, however, for the operator to selectively determine at the start of diagnosis mode which mode 1 or 2 is first executed or that one of the two modes is only carried out depending on the type of fault and the target of the diagnosis. It is also possible to manually shift between the two modes. For those purposes, the diagnosis mode may be made selectable by coding the on/off modes of the start switch. Although there are two control units having the diagnosis function in the above description, it is understood that the present invention is applicable to the use of three or more control units.

It would easily be understood that the present invention is applicable to a communication network for vehicle control in which the control units 1 to 4 are connected to each other by a common bus B as shown in FIG. 22 or to one another in a loop by a group of buses B1 to B4 as shown in FIG. 23. The frame structure of a unique signal transmitted from the control units may be such as shown in FIG. 24, which is also indicated in "Jidosha Gijutsu"(Vehicle Technology), Vol. 49, No. 7, 1995, pp. 42. The header of the frame structure includes data ID, token, and source address. BBC at the end represents a block check character for detecting and correcting data error. As is well known, that system permits only the unit with a token to have the right for transmission. For transferring the token to a next control unit, the address of the next control unit is set in the token which is included in the header (the front frame) and sent by the frame transmission.

According to the present invention, the self-diagnosis function attributed to an electronic control apparatus is dexterously combined with the manual diagnosis operation by the operator. In other words, while faults on the communication lines between the control units (ECUs) and in the transmission, receiving and controlling functions of each control unit are automatically identified and indicated through the automatic diagnosis operation with a predetermined diagnosis program, the presence or absence of a fault and if present, the location of the fault on the input and output systems is semi-automatically and almost instantly detected and discriminated by the operator selectively controlling the auxiliary input devices to be examined. This allows the diagnosis function to be carried out with practical readiness and reliability but without particular skill of the operator. Also, there is no need of additional external diagnosis apparatuses and an electronic control apparatus provided with the diagnosis function of the present invention will be increased in the cost performance.

Furthermore, the diagnosis program for the ECUs is relatively small in the size thus requiring the smaller memory size and contributing to the cost reduction. Also, if the diagnosis process of mode 2 starts after mode 1 is completed, the fundamental requirements for the communication network such as the communication function between the control units and the coincidence or matching of specifications and destination between the control units, of which fault may cause critical results, are first examined for normal or abnormal, whereby the efficiency of the diagnosis process will highly be increased.

What is claimed is:

1. A communication network for vehicle control having a plurality of control units (ECUs) connected to one another via communication lines for transmitting and receiving unique signals, each of the control units being connected to at least one of auxiliary input and output devices, each of at least two of the control units including a transmitter, a receiver, and a controller, and performing a diagnosis function and, each provided with an indicating means, the communication network comprising:

a diagnosis mode signal generating means for setting at least the control unit provided with the diagnosis function to a diagnosis mode;

the receiver in the control unit with the diagnosis function, according to the diagnosis mode, receiving the unique signal from at least one other control unit; and the controller in the control unit with the diagnosis function, according to the diagnosis mode, determining the presence of a fault in the communication network on the basis of a combination of the unique signal received and an input signal from the auxiliary input device connected to the control unit with the diagnosis function, and driving the indicating means for indicating the result of diagnosis.

2. A communication network for vehicle control according to claim 1, wherein the controller in the control unit with the diagnosis function, according to the diagnosis mode, transmits to at least one other control unit provided with the diagnosis function its unique signal which carries the result of diagnosis.

3. A communication network for vehicle control according to claim 1, wherein the unique signal transmitted from said at least one other control unit includes information for determining whether or not said at least one other control unit has correctly received a unique signal of still another control unit.

4. A communication network for vehicle control according to claim 3, wherein the control unit with the diagnosis function judges that it has not correctly received the unique signal of the other control unit when the unique signal fails to arrive within a predetermined period of time.

5. A communication network for vehicle control according to claim 1, wherein the indicating means is one originally provided for indicating the normal operation of the communication network for vehicle control in response to its normal action.

6. A communication network for vehicle control according to claim 1, wherein the diagnosis mode is shifted from a first diagnosis mode to a second diagnosis mode or vice versa, the first diagnosis mode allowing the control unit with the diagnosis function to automatically perform a diagnosis process corresponding to a predetermined procedure of diagnosis and to drive the indicating means for indicating the result of diagnosis, the second diagnosis mode allowing the diagnosis process to be carried out in response to a signal indicative of the manual operation of a desired one of the auxiliary input devices in the communication network and driving the indicating means for indicating the result of diagnosis with two different kinds of stimulus.

7. A communication network for vehicle control according to claim 6, wherein the first diagnosis mode is adapted for diagnosing the communication function of the control unit and the second diagnosis mode is adapted for diagnosing its auxiliary input and/or output devices, and the control function of the control unit which is connected with its auxiliary input and/or output devices.

8. A communication network for vehicle control according to claim 6, wherein the first and second diagnosis modes are manually switched from one to the other.

9. A communication network for vehicle control according to claim 1, wherein the indicating means connected to each of the control units is driven for emitting at least one of light and sound in a predetermined manner.

10. A communication network for vehicle control according to claim 9, wherein in response to the driving signal, the indication means connected to a part of the control units produces light signals and the other(s) generate sound signals.

11. A communication network for vehicle control according to claim 1, wherein the diagnosis mode signal generating means is a switch connected to at least one of the control units.

12. A communication network for vehicle control according to claim 1, wherein the diagnosis mode signal generating means is a common switch connected to all the control units provided with the diagnosis function.

13. A communication network for vehicle control according to claim 1, wherein the indicating means is driven by a pulse signal which is coded corresponding to the fault or error detected.

14. A communication network for vehicle control according to claim 1, wherein the unique signal transmitted from at least a part of the control units carries data of the destination of the control unit on the transmitting side.

15. A communication network for vehicle control according to claim 14, wherein the control unit provided with the diagnosis function drives its indicating means to indicate a fault when its destination does not conform to the destination received from another control unit.

16. A method of diagnosing a vehicle control communication network which has a plurality of control units connected to one another via communication lines, each of the control units being connected to at least one of auxiliary input and output devices, and a diagnosis mode signal generating means for setting the control unit to a diagnosis mode, each of said at least two of the control units including a transmitter, a receiver, and a controller for performing a diagnosis function and being provided with an indicating means, comprising the steps of:

setting the control unit provided with the diagnosis function to one of a first diagnosis mode and a second diagnosis mode by operating the diagnosis mode signal generating means;

switching the diagnosis mode from one to the other in the control unit provided with the diagnosis function;

allowing, in the first diagnosis mode, the control unit with the diagnosis function to receive a unique signal from another control unit, automatically diagnose the condition of the other control units and communication lines on the basis of the received unique signal, and drive the indicating means connected to the control unit in a given manner for indicating the result of diagnosis; and allowing, in the second diagnosis mode, the control unit to drive the indicating means connected to the control unit with the diagnosis function in a given manner in response to a switch signal input indicative of the manual operation of selected one of the auxiliary input devices connected to the control unit.

17. A method of diagnosing a vehicle control communication network according to claim 16, wherein the control unit with the diagnosis function, in the first diagnosis mode, when judging that a unique signal received from another control unit is not normal, transmits its own unique signal with data indicating that the communication from said another control unit to itself has been abnormal.

18. A method of diagnosing a vehicle control communication network according to claim 17, wherein the control unit with the diagnosis function judges that a unique signal is normally received from the another control unit only when the unique signal has arrived from said another control unit within a predetermined period of time.

19. A method of diagnosing a vehicle control communication network according to claim 17, wherein the unique signals respectively carries codes of the specification of the corresponding control units, and when the specification code received from the another control unit does not conforms to that of a further control unit, the control unit with the diagnosis function loads said own unique signal with data indicating the unconformity of the codes.

20. A method of diagnosing a vehicle control communication network according to claim 16, wherein the second diagnosis mode allows a control unit to, when detecting an operation signal indicative of operating one of its auxiliary input devices, load its unique signal with data of detection of the operation signal, and allows the control unit with the diagnosis function to, upon detecting that a unique signal received from the another control unit carries the data of detecting the operation signal input, energize the predetermined indicating means for indication of that fact.

21. A method of diagnosing a vehicle control communication network according to claim 20, wherein the operation signal received from the auxiliary input device is adapted for driving a corresponding one of the auxiliary output devices connected to the control unit.

* * * * *